(12) United States Patent
Kaminaga et al.

(10) Patent No.: US 11,391,235 B2
(45) Date of Patent: Jul. 19, 2022

(54) ENGINE SYSTEM

(71) Applicant: Mazda Motor Corporation, Hiroshima (JP)

(72) Inventors: Takashi Kaminaga, Aki-gun (JP); Tatsuya Fujikawa, Aki-gun (JP); Masahisa Yamakawa, Aki-gun (JP); Naoya Ito, Aki-gun (JP); Ryohei Matsuo, Aki-gun (JP); Yuta Sasaki, Aki-gun (JP); Junki Hori, Aki-gun (JP); Mitsuhiro Muto, Aki-gun (JP); Takuma Fujii, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/452,625

(22) Filed: Oct. 28, 2021

(65) Prior Publication Data
US 2022/0154663 A1 May 19, 2022

(30) Foreign Application Priority Data
Nov. 13, 2020 (JP) .............................. JP2020-189709

(51) Int. Cl.
*F02D 41/30* (2006.01)
*F02D 41/40* (2006.01)
(Continued)

(52) U.S. Cl.
CPC ............ *F02D 41/3041* (2013.01); *F02B 1/10* (2013.01); *F02B 1/14* (2013.01); *F02D 41/0002* (2013.01);
(Continued)

(58) Field of Classification Search
CPC ............ F02D 41/3041; F02D 41/0002; F02D 41/0077; F02D 41/402; F02D 41/3076;
(Continued)

(56) References Cited

U.S. PATENT DOCUMENTS 10,677,143 B2 * 6/2020 Tsumura ............. F02D 41/0057
10,900,460 B2 * 1/2021 Maekawa ............. F02D 35/028
(Continued)

FOREIGN PATENT DOCUMENTS

EP 1953375 A1 8/2008
JP 2009091995 A 4/2009
(Continued)

OTHER PUBLICATIONS

European Patent Office, Extended European Search Report Issued in Application No. 21203672.7, dated Apr. 26, 2022, Germany, 10 pages.

*Primary Examiner* — Hai H Huynh
(74) *Attorney, Agent, or Firm* — Alleman Hall Creasman & Tuttle LLP

(57) ABSTRACT

An engine system is provided, including a controller which estimates a mass ratio (G/F) of intake air inside a cylinder (containing fresh air and burnt gas) to fuel, and controls devices of an engine at a given engine speed so that, while a demanded engine load is a first load, at least part of a mixture gas inside the cylinder combusts by flame-propagation when the estimated G/F is below a first G/F, and the entire mixture gas combusts by compression ignition when the estimated G/F is above the first G/F, whereas while the demanded load is a second load (>the first load), at least part of the mixture gas combusts by flame-propagation when the estimated G/F is below a second G/F (<the first G/F), and the entire mixture gas combusts by compression ignition when the estimated G/F is above the second G/F.

20 Claims, 13 Drawing Sheets

(51) Int. Cl.
  *F02B 1/10* (2006.01)
  *F02D 41/00* (2006.01)
  *F02B 1/14* (2006.01)

(52) U.S. Cl.
  CPC ..... *F02D 41/0077* (2013.01); *F02D 41/3076* (2013.01); *F02D 41/402* (2013.01); *F02D 2041/001* (2013.01); *F02D 2200/0616* (2013.01); *F02D 2200/101* (2013.01)

(58) Field of Classification Search
  CPC ....... F02D 2041/001; F02D 2200/0616; F02D 2200/101; F02B 1/10; F02B 1/14
  USPC ......... 123/299, 300, 305, 436; 701/103–105, 701/110
  See application file for complete search history.

(56) References Cited

U.S. PATENT DOCUMENTS

2015/0114342 A1    4/2015  Iwai et al.
2017/0292462 A1*  10/2017  Tsuda ................. F02D 41/1497

FOREIGN PATENT DOCUMENTS

| JP | 2012215098 A | 11/2012 |
| JP | 2014173532 A | 9/2014 |

* cited by examiner

ENGINE SYSTEM

TECHNICAL FIELD

The present disclosure relates to an engine system.

BACKGROUND OF THE DISCLOSURE

Compression ignition combustion (hereinafter, may simply be referred to as "CI combustion") improves the thermal efficiency of an engine. JP2012-215098A discloses an engine in which a mixture gas is combusted by the CI combustion, more accurately, by HCCI (Homogeneous Charged Compression Ignition) combustion when an engine load is low, and the mixture gas is combusted by SI (Spark Ignition) combustion using a spark plug when the engine load is high. This engine switches the combustion mode corresponding to the change in the engine load. Note that in the SI combustion, the mixture gas combusts by flame propagation after the ignition, and thus, the SI combustion is synonymous with flame propagation combustion in the following description.

Meanwhile, the present inventors conducted a diligent study on the CI combustion. As a result, it became apparent that main control factors of the CI combustion are the temperature of the mixture gas inside a cylinder, and a mass ratio (G/F) of intake air inside the cylinder containing burnt gas to fuel. Moreover, an ignition timing and a combustion period of the CI combustion can be controlled by an in-cylinder temperature at a close timing of an intake valve ($T_{IVC}$) and the G/F being adjusted to be a target $T_{IVC}$ and a target G/F. Furthermore, according to the study, the present inventors found that there is a gap at a certain $T_{IVC}$ between the G/F at which the SI combustion is possible and the G/F at which the CI combustion is possible, and the G/F demanded in each combustion mode varies according to the engine load.

Note that "SI combustion is possible" corresponds to a state where the combustion stability of the SI combustion meets a standard, and abnormal combustion (e.g., knocking and preignition) can be reduced. For example, when the G/F is too high (i.e., too lean), the combustion stability of the SI combustion does not meet the standard.

"CI combustion is possible" corresponds to a state where the combustion stability of the CI combustion meets a standard, and abnormal combustion (e.g., overly rapid combustion and misfire) can be reduced. For example, when the G/F is too low (i.e., too rich), the CI combustion is likely to cause abnormal combustion.

Even if the combustion mode is to be switched between the CI combustion and the SI combustion corresponding to the change in the engine load as disclosed in JP2012-215098A, the G/F at which the SI combustion is possible and the G/F at which the CI combustion is possible vary according to the engine load as described above. Therefore, upon the switching of the combustion mode, the G/F corresponding to the target combustion mode may not be achieved, and appropriate switching is difficult. If the combustion mode is not appropriately switched, fuel efficiency cannot be improved.

SUMMARY OF THE DISCLOSURE

As a result of further diligent study to solve the above problem, the present inventors newly found to vary a condition of a mass ratio (G/F) to be satisfied according to a load of an engine when switching a combustion mode between a first combustion mode in which the entire mixture gas combusts by self-ignition (e.g., HCCI (Homogeneous Charged Compression Ignition) combustion), and a second combustion mode in which at least part of mixture gas combusts by flame propagation (e.g., SI (Spark Ignition) combustion and SPCCI (SPark Controlled Compression Ignition) combustion).

According to one aspect of the present disclosure, an engine system is provided, which includes an engine having a cylinder and a piston reciprocatably accommodated in the cylinder, an injector attached to the engine and configured to inject fuel into the cylinder, a spark plug attached to the engine and configured to ignite a mixture gas of fuel and intake air, the intake air containing fresh air and burnt gas, a variable valve operating device connected to an intake valve and an exhaust valve, and configured to control opening and closing of the intake valve and the exhaust valve to adjust a filling amount of the intake air, and a controller electrically connected to the injector, the spark plug, and the variable valve operating device, and configured to control the injector, the spark plug, and the variable valve operating device according to a demanded load of the engine. The controller estimates a mass ratio (G/F) of the intake air inside the cylinder to fuel. While the engine operates at a given speed and the demanded engine load is a first load, when the mass ratio is estimated to be below a first G/F, the controller controls the injector and the spark plug so that at least part of the mixture gas inside the cylinder combusts by flame propagation, and when the mass ratio is estimated to be above the first G/F, the controller controls the injector so that the entire mixture gas inside the cylinder combusts by compression ignition. While the engine operates at the given speed and the demanded engine load is a second load higher than the first load, when the mass ratio is estimated to be below a second G/F lower than the first G/F, the controller controls the injector and the spark plug so that at least part of the mixture gas inside the cylinder combusts by flame propagation, and when the mass ratio is estimated to be above the second G/F, the controller controls the injector so that the entire mixture gas inside the cylinder combusts by compression ignition.

According to this configuration, while the engine operates at the given speed and the demanded engine load is the first load, the controller controls the injector and the spark plug so that at least part of the mixture gas inside the cylinder combusts by flame propagation when the controller estimates that the mass ratio (G/F) is below the first G/F.

By the controller controlling the injector and the spark plug, at least part of the mixture gas inside the cylinder combusts by flame propagation. Here, the entire mixture gas inside the cylinder may combust by flame propagation (i.e., SI combustion). Alternatively, the mixture gas inside the cylinder may combust by SPCCI (SPark Controlled Compression Ignition) combustion, or the SI combustion and the SPCCI combustion may be switched according to the demanded engine load, etc. In the SPCCI combustion, at least part of the mixture gas inside the cylinder combusts by flame propagation and the remaining mixture gas combusts by compression ignition. Here, when the G/F is relatively low (the G/F<the first G/F), the stability of the flame propagation combustion is enhanced. Moreover, by reducing the burnt gas to make the G/F lower, the in-cylinder temperature decreases and abnormal combustion is reduced.

Further, while the engine operates at the given speed and the demanded engine load is the first load, the controller controls the injector so that the entire mixture gas inside the cylinder combusts by compression ignition when the controller estimates that the mass ratio is above the first G/F.

By the controller controlling the injector, the entire mixture gas inside the cylinder combusts by compression ignition. Here, when the G/F is relatively high (the G/F>the first G/F), it is advantageous in improving the fuel efficiency of the engine. Moreover, by increasing the burnt gas to make the G/F higher, the in-cylinder temperature increases and the combustion stability of the compression ignition combustion is enhanced.

In this way, when the engine operates at the given speed and the demanded engine load is the first load, the controller switches, having the first G/F as a boundary, the flame propagation combustion (the combustion mode in which at least part of the mixture gas combusts by flame propagation) and the compression ignition combustion (the combustion mode in which the entire mixture gas combusts by compression ignition).

On the other hand, while the engine operates at the given speed and the demanded engine load is the second load which is higher than the first load, the controller controls the injector and the spark plug so that at least part of the mixture gas inside the cylinder combusts by flame propagation when the controller estimates that the G/F is below the second G/F which is lower than the first G/F, and the controller controls the injector so that the entire mixture gas inside the cylinder combusts by compression ignition when the controller estimates that the G/F is above the second G/F.

That is, when the engine operates at the given speed and the demanded engine load is the second load (>the first load), the controller switches, having the second G/F as a boundary, the flame propagation combustion and the compression ignition combustion.

According to the present inventors, at the second load, the fuel injection amount is larger compared to at the first load, which relatively increases the density of fuel inside the cylinder. Thus, at the second load, the stability of the compression ignition combustion relatively improves, and the compression ignition combustion can appropriately be achieved even when the G/F is below the first G/F at the first load.

Therefore, when the demanded engine load is the second load, the second G/F which is the boundary between the flame propagation combustion and the compression ignition combustion can be set lower than the first G/F when the demanded engine load is the first load. As a result, the range of the G/F at which the compression ignition combustion is possible can be extended to the lower-G/F side. Such an expansion in the G/F range allows the flame propagation combustion to be switched to the compression ignition combustion earlier, thus improving the fuel efficiency.

While the engine operates at the given speed and the demanded engine load is the first load, when the mass ratio is estimated to be above a third G/F higher than the first G/F, the controller may control the injector to make an injection center of gravity be at a first timing, and inhibit the operation of the spark plug so that the entire mixture gas inside the cylinder combusts by compression ignition, whereas when the mass ratio is estimated to be above the first G/F and below the third G/F, the controller may control the injector to make the injection center of gravity be at a second timing later than the first timing, and inhibit the operation of the spark plug so that the entire mixture gas inside the cylinder combusts by compression ignition. The injection center of gravity may be defined based on an injection timing and an injection amount of fuel in one cycle.

While the engine operates at the given speed and the demanded engine load is the first load, the controller controls the injector and the variable valve operating device when the controller estimates the G/F is above the third G/F higher than the first G/F. The injector injects fuel so that the injection center of gravity is at the first timing. The first timing is a relatively early timing. By injecting fuel into the cylinder at the early timing, fuel can be spread using the comparatively strong intake flow, and thus, a homogeneous or substantially homogeneous mixture gas is formed inside the cylinder. When the G/F is above the third G/F, the entire mixture gas inside the cylinder combusts by compression ignition (i.e., the HCCI combustion). For example, by increasing the burnt gas to be introduced into the cylinder to make the G/F higher, the in-cylinder temperature increases, which enhances the combustion stability of the HCCI combustion. Moreover, the high G/F is advantageous in improving the fuel efficiency of the engine.

While the engine operates at the given speed and the demanded engine load is the first load, when the controller estimates the G/F is above the first G/F and below the third G/F, the controller controls the injector and the variable valve operating device to achieve a third combustion mode different from the flame propagation combustion and the HCCI combustion. The G/F of the mixture gas inside the cylinder can be promptly changed between the first G/F and the third G/F.

The injector injects fuel so that the injection center of gravity is at the second timing which is relatively late. The injector may perform the fuel injection all at once or dividedly. The injection center of gravity may be defined by the center of mass of fuel injected all at once or dividedly into a plurality of times in one cycle, with respect to a crank angle. When the injection center of gravity is relatively late, the fuel supply into the cylinder is delayed, and thus, a period of time from the fuel injection to the ignition of the mixture gas becomes shorter. Unlike the case where the G/F is above the third G/F as described above, the mixture gas inside the cylinder does not become homogeneous. Such an inhomogeneous mixture gas achieves the combustion which meets the standard of combustion stability while reducing abnormal combustion at the middle G/F between the first G/F and the third G/F (in more detail, at least part of the mixture gas combusts by compression ignition).

Therefore, this engine can seamlessly switch the combustion mode between the flame propagation combustion (at least a part of the mixture gas combusts by flame propagation), the HCCI combustion, and the third combustion mode. As a result, securing combustion stability and reducing abnormal combustion can be achieved.

Furthermore, in each of the HCCI combustion and the third combustion mode, at least part of the mixture gas combusts by compression ignition, and also the G/F of the mixture gas is comparatively high. Thus, this engine is fuel efficient.

While the engine operates at the given speed and the demanded engine load is the first load, when the mass ratio is estimated to be above the third G/F, the controller may control the injector to inject fuel during an intake stroke, and whereas when the mass ratio is estimated to be above the first G/F and below the third G/F, the controller may control the injector to inject fuel during each of the intake stroke and a compression stroke.

While the engine operates at the given speed and the demanded engine load is the first load, the injector injects fuel into the cylinder during an intake stroke when the G/F is estimated to be above the third G/F. Since the fuel can be spread using the intake flow, the mixture gas inside the cylinder becomes homogeneous or substantially homogeneous. This homogeneous mixture gas combusts by compression ignition (i.e., the HCCI combustion).

While the engine operates at the given speed and the demanded engine load is the first load, when the G/F is estimated to be above the first G/F and below the third G/F, the injector injects fuel into the cylinder during each of the intake stroke and a compression stroke. The fuel injected during the intake stroke spreads using the intake flow, and forms the homogeneous mixture gas. The fuel then injected during the compression stroke makes the mixture gas inhomogeneous. The inhomogeneous mixture gas achieves the combustion which meets the standard of combustion stability while reducing abnormal combustion.

While the engine operates at the given speed, and the controller controls the injector and the spark plug so that at least part of the mixture gas inside the cylinder combusts by flame propagation, when the mass ratio is estimated to be above a fourth G/F, the controller may actuate the spark plug so that at least part of the mixture gas inside the cylinder combusts by flame propagation, and the remaining mixture gas combusts by compression ignition, whereas when the mass ratio is estimated to be below the fourth G/F, the controller may actuate the spark plug so that the entire mixture gas inside the cylinder combusts by flame propagation.

When the G/F is relatively high, the in-cylinder temperature increases. In this case, the controller controls the spark plug so that at least part of the mixture gas inside the cylinder combusts by flame propagation, and the remaining mixture gas combusts by compression ignition. The combustion mode achieved here is the SPCCI combustion described above. When the G/F is relatively high, the SPCCI combustion can achieve both securing the combustion stability and reducing abnormal combustion.

When the G/F is relatively low, as described above, the stability of the flame propagation combustion is enhanced, and the in-cylinder temperature decreases and abnormal combustion is reduced by reducing the burnt gas to make the G/F lower. In this case, the controller controls the spark plug so that the entire mixture gas inside the cylinder combusts by flame propagation. The flame propagation combustion is suitable for when the G/F is low.

The variable valve operating device may control the opening and closing of the intake valve and the exhaust valve so that the burnt gas remains inside the cylinder, or the burnt gas is introduced into the cylinder through the intake valve or the exhaust valve.

By making the so-called internal EGR gas be remained inside or introduced into the cylinder, the in-cylinder temperature can be increased, which is advantageous in improving combustion stability of the compression ignition combustion.

A geometric compression ratio of the engine may be 15:1 or above.

High geometric compression ratio is advantageous in improving the combustion stability of the compression ignition combustion. Moreover, the high geometric compression ratio improves the thermal efficiency of the engine.

A valve lift of the exhaust valve may include a lift curve for the flame propagation combustion and a lift curve for the compression ignition combustion and may be switchable therebetween. In the lift curve for the compression ignition combustion, after the exhaust valve opens during an exhaust stroke and a lift amount of the exhaust valve gradually decreases after the maximum lift, the exhaust valve may maintain a given lift amount until the exhaust valve closes at a given timing during the intake stroke after an intake top dead center.

DETAILED DESCRIPTION OF THE DISCLOSURE

Hereinafter, one embodiment of a method of controlling an engine and an engine system is described with reference to the accompanying drawings. The engine, the engine system, and the control method thereof are merely illustration.

Figure 1:
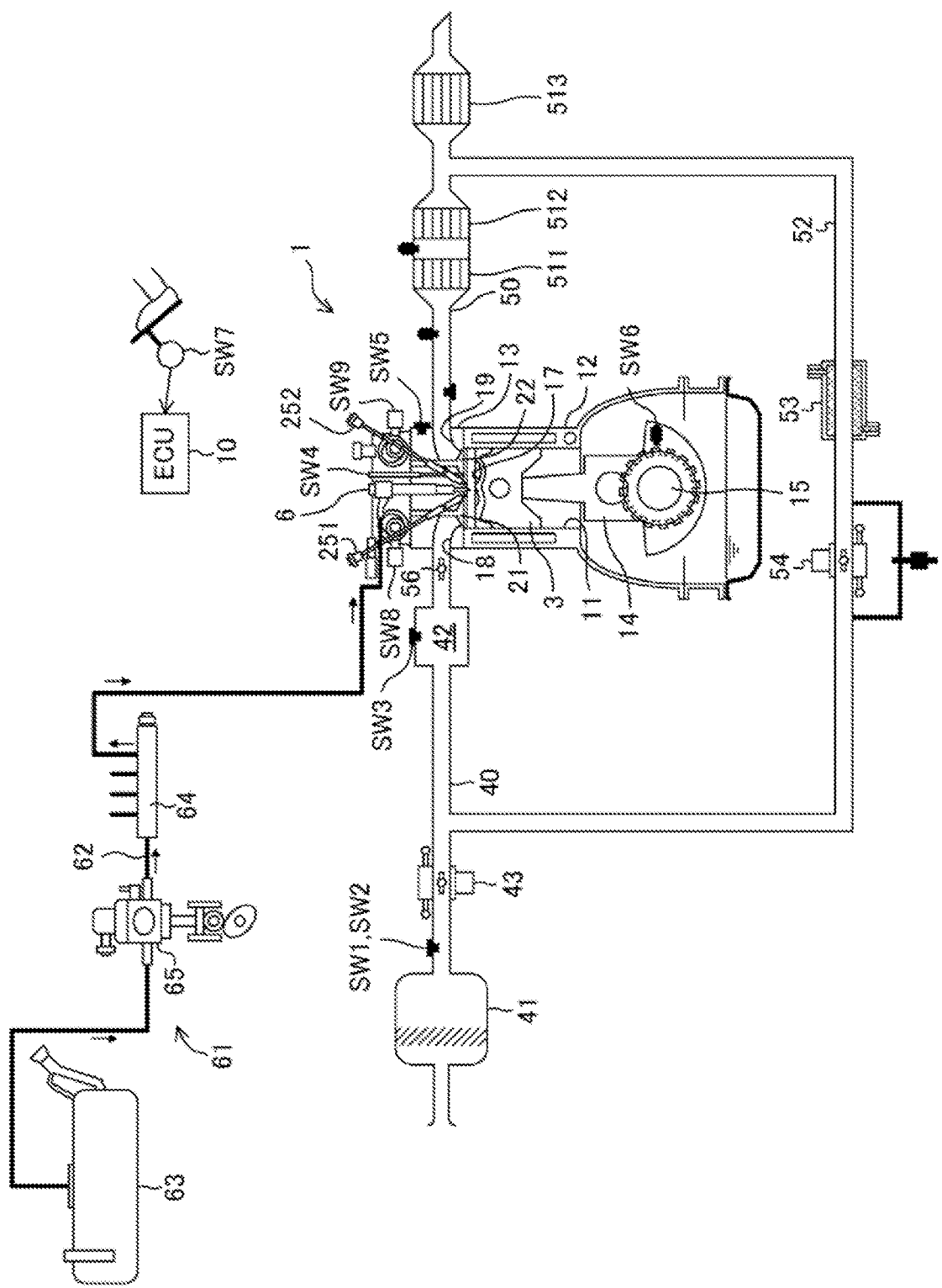
FIG. 1 is a view illustrating an engine system.
Figure 2:
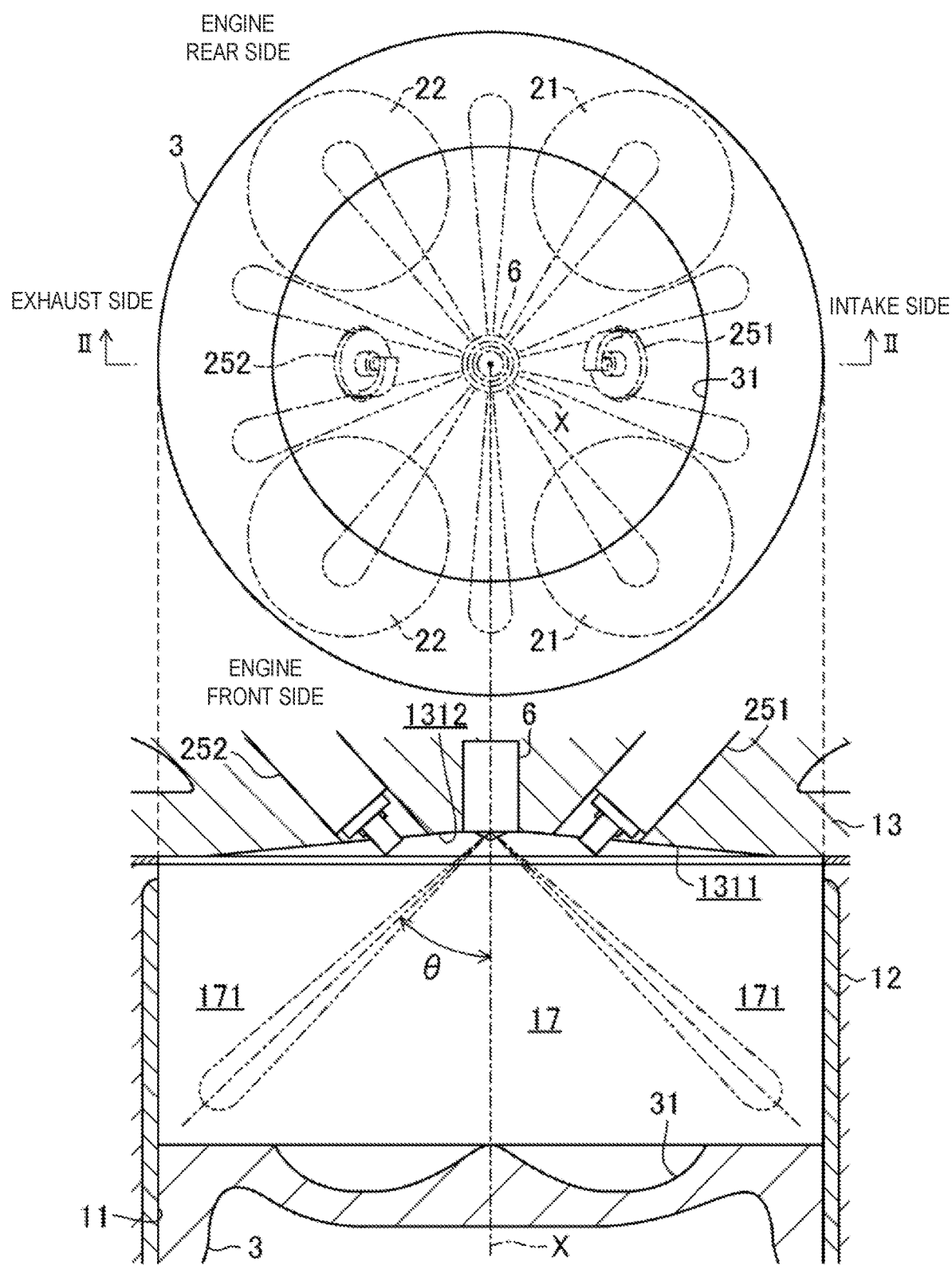
FIG. 2 is a view illustrating a structure of a combustion chamber of an engine, where an upper part of this figure is a plan view of the combustion chamber, and a lower part of this figure is a cross-sectional view taken along a line II-II in the upper part when fuel is injected into a cylinder in a middle period of a compression stroke.
Figure 3:
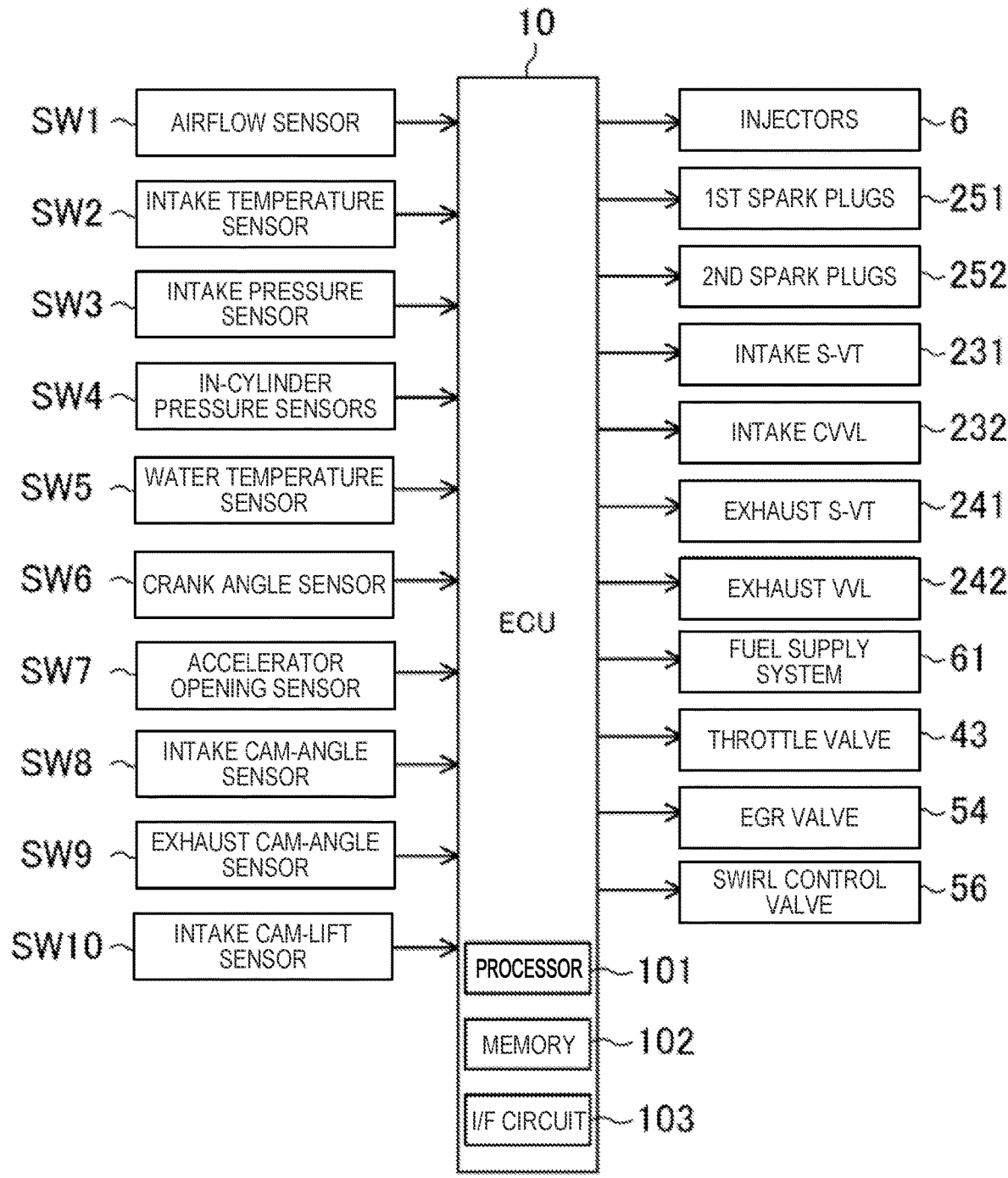
FIG. 3 is a block diagram of the engine system.

FIG. 1 is a view illustrating the engine system. FIG. 2 is a view illustrating a structure of a combustion chamber of the engine. The intake side and the exhaust side illustrated in FIG. 1 are opposite from the intake side and the exhaust side illustrated in FIG. 2. FIG. 3 is a block diagram illustrating a control device for the engine.

The engine system includes an engine 1. The engine 1 includes cylinders 11, and is a four-stroke engine in which an intake stroke, a compression stroke, an expansion stroke, and an exhaust stroke are repeated in each cylinder 11. The engine 1 is mounted on a four-wheeled automobile, and the automobile travels according to the operation of the engine 1. Fuel of the engine 1 is gasoline in this example.

(Configuration of Engine)

The engine 1 is provided with a cylinder block 12 and a cylinder head 13. The cylinder head 13 is placed on the cylinder block 12. A plurality of cylinders 11 are formed inside the cylinder block 12. The engine 1 is a multi-cylinder engine. In FIG. 1, only one cylinder 11 is illustrated.

A piston 3 is inserted into each cylinder 11. The piston 3 is coupled to a crankshaft 15 through a connecting rod 14. The piston 3 reciprocates inside the cylinder 11. The piston 3, the cylinder 11, and the cylinder head 13 define a combustion chamber 17.

As illustrated in the lower part of FIG. 2, a lower surface of the cylinder head 13 (i.e., a ceiling of the cylinder 11) is constituted by a sloped surface 1311 and a sloped surface 1312. The sloped surface 1311 is a slope on a side of an intake valve 21 (described later), and inclines upwardly toward the central part of the ceiling of the cylinder 11. The sloped surface 1312 is a slope on a side of an exhaust valve 22 (described later), and inclines upwardly toward the central part of the ceiling of the cylinder 11. The ceiling of the cylinder 11 is a so-called pentroof type.

A cavity 31 is formed in a top surface of the piston 3. The cavity 31 is dented from the top surface of the piston 3. The cavity 31 has a shallow dish shape in this example. The central part of the cavity 31 protrudes upwardly, and the protruded part has a substantially conical shape.

A geometric compression ratio of the engine 1 is set to 15:1 or higher, and set to, for example, 30:1 or lower. As will be described later, the engine 1 performs compression ignition (CI) combustion of a mixture gas in part of an operation range of the engine. The CI combustion can be stabilized by a comparatively high geometric compression ratio.

The cylinder head 13 is formed with intake ports 18 for the respective cylinders 11 such that each intake port 18 communicates with the inside of the cylinder 11. Although detailed illustration is omitted, the intake port 18 is a so-called tumble port. That is, the intake port 18 has a shape which generates a tumble flow inside the cylinder 11. The pentroof-type ceiling of the cylinder 11 and the tumble port generate the tumble flow inside the cylinder 11. Note that the intake port 18 includes two intake ports in this example.

Each intake port 18 is provided with the intake valve 21 which opens and closes the intake port 18. A valve operating device is connected to the intake valve 21, and opens and closes the intake valve 21 at a given timing. The valve operating device may be a variable valve operating device which varies a valve timing and/or a valve lift. As illustrated in FIG. 3, the valve operating device includes an intake S-VT (Sequential-Valve Timing) 231 of a hydraulic type or an electric type. The intake S-VT 231 continuously changes a rotational phase of an intake camshaft within a given angle range.

Figure 5:
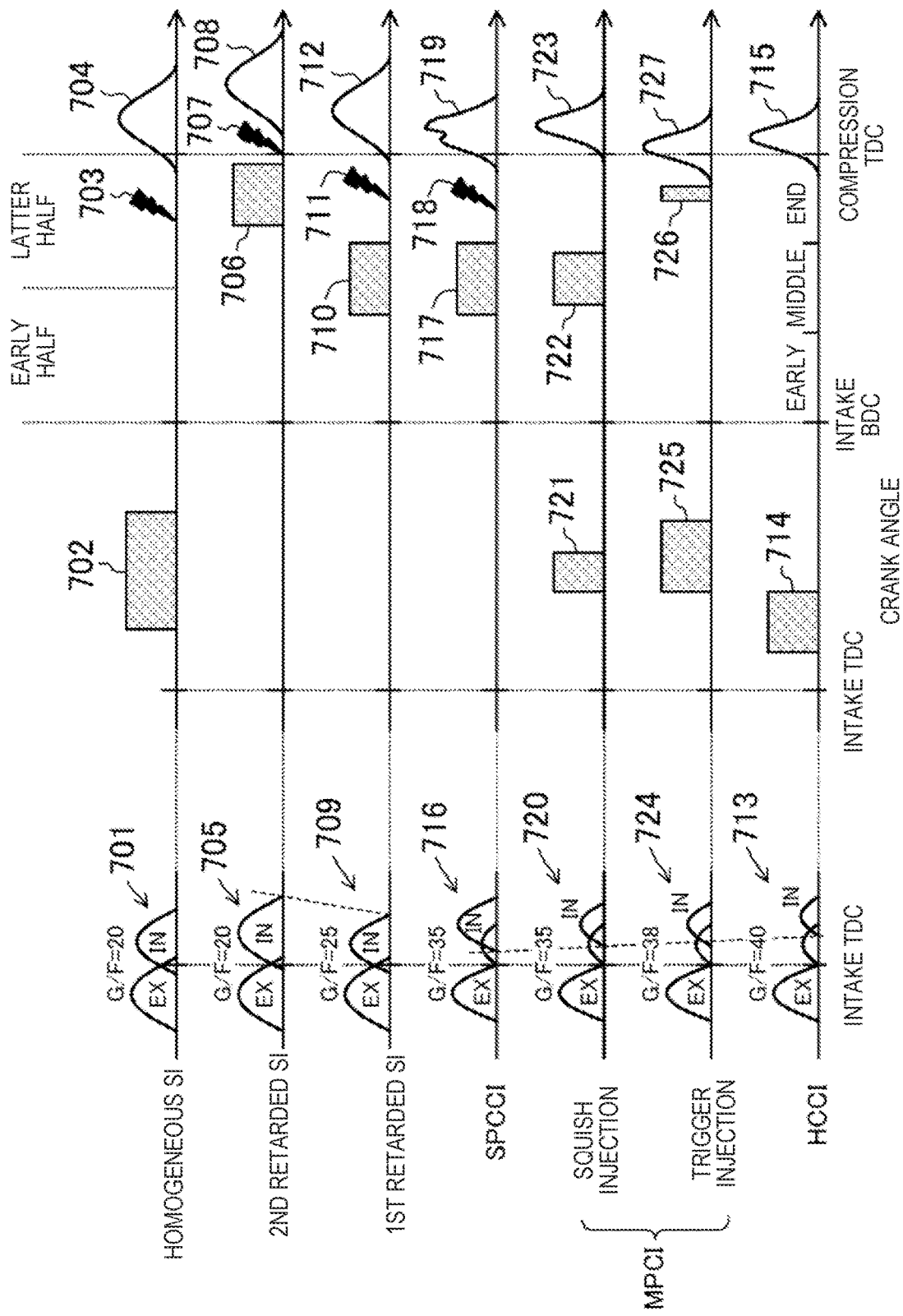
FIG. 5 is a view illustrating open and close operations of an intake valve and an exhaust valve, an injection timing of fuel, and an ignition timing in each combustion mode.

The valve operating device also includes an intake CVVL (Continuously Variable Valve Lift) 232. As illustrated in FIG. 5, the intake CVVL 232 can continuously change the lift amount of the intake valve 21 within a given range. Various known configurations can be adopted for the intake CVVL 232. For example, as disclosed in JP2007-085241A, the intake CVVL 232 may be comprised of a linkage mechanism, a control arm, and a stepping motor. The linkage mechanism reciprocatably pivots a cam which operates the intake valve 21, in an interlocking manner with a rotation of a camshaft. The control arm variably sets a lever ratio of the linkage mechanism. As the lever ratio of the linkage mechanism changes, a pivoting amount of the cam which pushes down the intake valve 21 changes. The stepping motor electrically drives the control arm to change the pivoting amount of the cam, thus changing the lift amount of the intake valve 21.

The cylinder head 13 is formed with exhaust ports 19 for the respective cylinders 11 such that each exhaust port 19 communicates with the inside of the cylinder 11. Note that the exhaust port 19 includes two exhaust ports in this example.

Each exhaust port 19 is provided with the exhaust valve 22 which opens and closes the exhaust port 19. A valve operating device is connected to the exhaust valve 22, and opens and closes the exhaust valve 22 at a given timing. The valve operating device may be a variable valve operating device which varies a valve timing and/or a valve lift. As illustrated in FIG. 3, the valve operating device includes an exhaust S-VT (Sequential-Valve Timing) 241 of a hydraulic type or an electric type. The exhaust S-VT 241 continuously changes a rotational phase of an exhaust camshaft within a given angle range.

The valve operating device also includes an exhaust VVL (Variable Valve Lift) 242. Although illustration is omitted, the exhaust VVL 242 can switch a cam which opens and closes the exhaust valve 22. Various known configurations can be adopted for the exhaust VVL 242. For example, as disclosed in JP2018-168796A, the exhaust VVL 242 may be comprised of a first cam, a second cam, and a switching mechanism which switches between the first cam and the second cam. The first cam opens and closes the exhaust valve 22 during an exhaust stroke. The second cam opens and closes the exhaust valve 22 during the exhaust stroke, and also opens and closes the exhaust valve 22 again during an intake stroke, as illustrated in FIG. 5. The exhaust VVL 242 can change the lift of the exhaust valve 22 by changing the cam to open and close the exhaust valve 22 between the first cam and the second cam.

The intake S-VT 231, the intake CVVL 232, the exhaust S-VT 241, and the exhaust VVL 242 control the opening and closing of the intake valve 21 and the exhaust valve 22 to adjust an amount of fresh air and an amount of burnt gas to be introduced into the cylinder 11. The intake S-VT 231, the intake CVVL 232, the exhaust S-VT 241, and the exhaust VVL 242 adjust a filling amount of intake air.

Injectors 6 are attached to the cylinder head 13 for the respective cylinders 11. As illustrated in FIG. 2, each injector 6 is provided to the central part of the cylinder 11 in the plan view. In detail, the injector 6 is disposed in a valley part of the pentroof where the sloped surface 1311 and the sloped surface 1312 intersect with each other.

The injector 6 directly injects fuel into the cylinder 11. The injector 6 is a multiple nozzle hole type having a plurality of nozzle holes (not illustrated in detail). As illustrated by two-dot chain lines in FIG. 2, the injector 6 injects fuel radially outwardly from the central part to a peripheral part of the cylinder 11. As illustrated in the lower part of FIG. 2, an axis of the nozzle hole of the injector 6 has a given angle $\theta$ with respect to a center axis X of the cylinder 11. Although in this example the injector 6 has ten nozzle holes which are disposed at an equal angle in a circumferential direction, the number of nozzle holes and the positions thereof are not particularly limited to this structure.

The injector 6 is connected to a fuel supply system 61. The fuel supply system 61 is comprised of a fuel tank 63 which stores fuel, and a fuel supply passage 62 which couples the fuel tank 63 to the injector 6. A fuel pump 65 and a common rail 64 are interposed in the fuel supply passage 62. The fuel pump 65 pumps fuel to the common rail 64. The fuel pump 65 is a plunger-type pump driven by the crankshaft 15 in this example. The common rail 64 stores at a high fuel pressure the fuel pumped from the fuel pump 65. When the injector 6 is valve-opened, the fuel stored in the common rail 64 is injected into the cylinder 11 from the nozzle holes of the injector 6. The pressure of the fuel supplied to the injector 6 may be changed according to the operating state of the engine 1. Note that the configuration of the fuel supply system 61 is not limited to the configuration described above.

A first spark plug 251 and a second spark plug 252 are attached to the cylinder head 13 for each cylinder 11. Each of the first spark plug 251 and the second spark plug 252 forcibly ignites the mixture gas inside the cylinder 11. As illustrated in FIG. 2, the first spark plug 251 is disposed between the two intake valves 21, and the second spark plug 252 is disposed between the two exhaust valves 22. A tip end of the first spark plug 251 and a tip end of the second spark plug 252 are located near the ceiling of the cylinder 11 on the intake side and the exhaust side of the injector 6, respectively. Note that only one spark plug may be provided.

The engine 1 is connected at one side surface to an intake passage 40. The intake passage 40 communicates with the intake ports 18 of the cylinders 11. Air to be introduced into the cylinders 11 flows through the intake passage 40. The intake passage 40 is provided at its upstream-end part with an air cleaner 41. The air cleaner 41 filters the air. The intake passage 40 is provided, near its downstream end, with a surge tank 42. Part of the intake passage 40 downstream of the surge tank 42 constitutes independent passages branching for the respective cylinders 11. Downstream ends of the independent passages are connected to the intake ports 18 of the cylinders 11, respectively.

The intake passage 40 is provided, between the air cleaner 41 and the surge tank 42, with a throttle valve 43. The throttle valve 43 adjusts its opening to control an amount of air to be introduced into the cylinder 11. Basically, the throttle valve 43 is fully opened during the operation of the engine 1. The introducing amount of air is controlled by the variable valve operating device described above.

The engine 1 is provided with a swirl generator which generates a swirl flow inside the cylinders 11. The swirl generator has a swirl control valve 56 attached to the intake passage 40. Although not illustrated in detail, the intake passage 40 includes a primary passage and a secondary passage, which are connected to each cylinder 11 downstream of the surge tank 42 corresponding to the two intake ports 18, and the swirl control valve 56 is provided to the secondary passage. The swirl control valve 56 is an opening control valve which is capable of choking a cross-section of the secondary passage. When the opening of the swirl control valve 56 is small, a flow rate of intake air flowing into the cylinder 11 from the primary passage is relatively large while a flow rate of intake air flowing into the cylinder 11 from the secondary passage is relatively small, which increases the swirl flow inside the cylinder 11. On the other hand, when the opening of the swirl control valve 56 is large, the flow rate of intake air flowing into the cylinder 11 from the primary passage and the flow rate of intake air flowing from the secondary passage are substantially equal, which reduces the swirl flow inside the cylinder 11. When the swirl control valve 56 is fully opened, the swirl flow is not generated.

The engine 1 is connected at the other side surface to an exhaust passage 50. The exhaust passage 50 communicates with the exhaust ports 19 of the cylinders 11. The exhaust passage 50 is a passage through which exhaust gas discharged from the cylinders 11 flows. Although detailed illustration is omitted, an upstream part of the exhaust passage 50 constitutes independent passages branching for the respective cylinders 11. Upstream ends of the independent passages are connected to the exhaust ports 19 of the cylinders 11, respectively.

The exhaust passage 50 is provided with an exhaust gas purification system having a plurality of catalytic converters. An upstream catalytic converter includes, for example, a three-way catalyst 511 and a GPF (Gasoline Particulate Filter) 512. A downstream catalytic converter includes a three-way catalyst 513. Note that the exhaust gas purification system is not limited to the illustrated configuration. For example, the GPF may be omitted. Moreover, the catalytic converter is not limited to the one including the three-way catalyst. Further, the disposed order of the three-way catalyst and the GPF may be changed suitably.

An exhaust gas recirculation (EGR) passage 52 is connected between the intake passage 40 and the exhaust passage 50. The EGR passage 52 is a passage through which a part of exhaust gas recirculates to the intake passage 40. An upstream end of the EGR passage 52 is connected to part of the exhaust passage 50 between the upstream and downstream catalytic converters. A downstream end of the EGR passage 52 is connected to part of the intake passage 40 between the throttle valve 43 and the surge tank 42.

The EGR passage 52 is provided with an EGR cooler 53 of a water-cooled type. The EGR cooler 53 cools exhaust gas. The EGR passage 52 is also provided with an EGR valve 54. The EGR valve 54 adjusts a flow rate of exhaust gas flowing through the EGR passage 52. The EGR valve 54 changes its opening to adjust a recirculating amount of the cooled exhaust gas.

As illustrated in FIG. 3, the control device for the engine 1 is provided with an ECU (engine control unit) 10 to operate the engine 1. The ECU 10 is a controller based on a well-known microcomputer, and includes a processor (e.g., a central processing unit (CPU)) 101, memory 102, and an interface (I/F) circuit 103. The processor 101 executes a program. The memory 102 is comprised of, for example, RAM (Random Access Memory) and/or ROM (Read Only Memory), and stores the program and data. The I/F circuit 103 outputs and inputs an electric signal. The ECU 10 is one example of a "controller."

As illustrated in FIGS. 1 and 3, various kinds of sensors SW1-SW10 are connected to the ECU 10. The sensors SW1-SW10 output signals to the ECU 10. The sensors include the following sensors. An airflow sensor SW1 is provided to the intake passage 40 downstream of the air cleaner 41, and measures the flow rate of air flowing through the intake passage 40. An intake temperature sensor SW2 is provided to the intake passage 40 downstream of the air cleaner 41, and measures the temperature of the air flowing through the intake passage 40. An intake pressure sensor SW3 is attached to the surge tank 42, and measures the pressure of the air to be introduced into the cylinder 11. An in-cylinder pressure sensor SW4 is attached to the cylinder head 13 for each cylinder 11, and measures the pressure inside the cylinder 11. A water temperature sensor SW5 is attached to the engine 1, and measures the temperature of coolant. A crank angle sensor SW6 is attached to the engine 1, and measures a rotational angle of the crankshaft 15. An accelerator opening sensor SW7 is attached to an accelerator pedal mechanism, and measures an accelerator opening corresponding to an operation amount of an accelerator pedal. An intake cam-angle sensor SW8 is attached to the engine 1, and measures a rotational angle of the intake camshaft. An exhaust cam-angle sensor SW9 is attached to the engine 1, and measures a rotational angle of the exhaust camshaft. An intake cam-lift sensor SW10 is attached to the engine 1, and measures the lift amount of the intake valves 21.

The ECU 10 determines the operating state of the engine 1 based on the signals of the sensors SW1-SW10, and also calculates a control amount of each device based on a control logic set in advance. The control logic is stored in the memory 102. The control logic includes calculating a target amount and/or the control amount by using a map stored in the memory 102.

The ECU 10 outputs electric signals related to the calculated control amounts to the injector 6, the first spark plug 251, the second spark plug 252, the intake S-VT 231, the intake CVVL 232, the exhaust S-VT 241, the exhaust VVL 242, the fuel supply system 61, the throttle valve 43, the EGR valve 54, and the swirl control valve 56.

(Operation Control Map of Engine)

Figure 4:
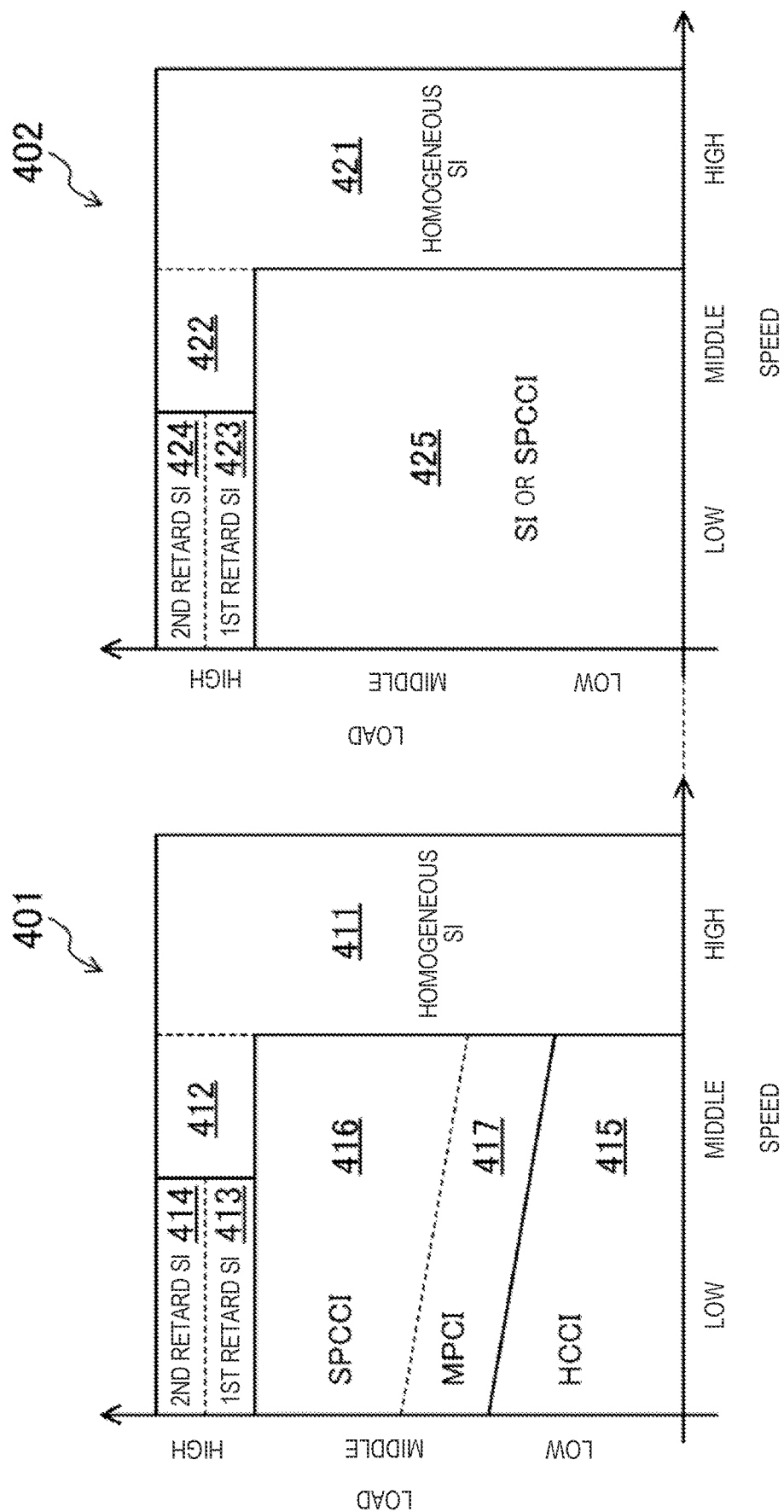
FIG. 4 is a view illustrating a base map related to operation of the engine.

FIG. 4 illustrates a base map related to the control of the engine 1. The base map is stored in the memory 102 of the ECU 10. The base map includes a first base map 401 and a second base map 402. The ECU 10 uses, for controlling the engine 1, the base map which is selected from the two base maps based on the temperature (high or low) of the coolant of the engine 1. The first base map 401 is a base map when the engine 1 is warm (warm state), and the second base map 402 is a base map when the engine 1 is cold (cold state).

The first base map 401 and the second base map 402 are defined based on a load and a speed of the engine 1. The first base map 401 is roughly divided into four ranges, a first range, a second range, a third range, and a fourth range, according to the load and speed. In more detail, the first range includes a high-speed range 411, and a high-load/middle-speed range 412. The high-speed range 411 covers from a low-load range to a high-load range. The second range corresponds to high-load/low-speed ranges 413 and 414. The third range corresponds to a low-load range 415 including idling operation, and covers from a low-speed range to a middle-speed range. The fourth range corresponds to middle-load ranges 416 and 417 where the load is higher than the low-load range 415, and lower than the high-load/middle-speed range 412 and the high-load/low-speed ranges 413 and 414.

The high-load/low-speed ranges 413 and 414 are comprised of a first high-load/low-speed range 413 at a relatively low load, and a second high-load/low-speed range 414 at a load higher than the first high-load/low-speed range 413 and including the maximum load. The middle-load ranges 416 and 417 are comprised of a first middle-load range 416, and a second middle-load range 417 at a load lower than the first middle-load range 416.

The second base map 402 is divided into three ranges, a first range, a second range, and a third range. In more detail, the first range includes a high-speed range 421 and a high-load/middle-speed range 422. The second range corresponds to high-load/low-speed ranges 423 and 424. The third range corresponds to a low-and-middle load range 425 covering, in the load direction, from a low-load range including the idling operation to a middle-load range, and in the speed direction, from a low-speed range to a middle-speed range.

The high-load/low-speed ranges 423 and 424 are comprised of a first high-load/low-speed range 423 at a relatively low load, and a second high-load/low-speed range 424 at a load higher than the first high-load/low-speed range 423 and including the maximum load.

The first range of the second base map 402 corresponds to the first range of the first base map 401, the second range of the second base map 402 corresponds to the second range of the first base map 401, and the third range of the second base map 402 corresponds to the third range and the fourth range of the first base map 401.

Here, the low-speed range, the middle-speed range, and the high-speed range may correspond to a low-speed range, a middle-speed range, and a high-speed range when the entire operation range of the engine 1 is substantially equally divided in the speed direction into three, respectively.

Moreover, the low-load range, the middle-load range, and the high-load range may correspond to a low-load range, a middle-load range, and a high-load range when the entire operation range of the engine 1 is substantially equally divided in the load direction into three, respectively.

(Combustion Mode of Engine)

Next, the operation of the engine 1 in each range is described in detail. The ECU 10 changes the open and close operations of the intake valve 21 and the exhaust valve 22, the injection timing of fuel, and whether or not to perform the ignition, according to a demanded load of the engine 1 (demanded engine load) and the speed of the engine 1 (engine speed). A combustion mode of the mixture gas inside the cylinder 11 is changed by the filling amount of intake air, the injection timing of fuel, and whether or not to perform the ignition being changed. The combustion mode of the engine 1 changes between homogeneous SI combustion, retarded SI combustion, HCCI (Homogeneous Charged Compression Ignition) combustion, SPCCI (SPark Controlled Compression Ignition) combustion, and MPCI (Multiple Premixed fuel injection Compression Ignition) combustion. FIG. 5 illustrates the open and close operations of the intake valve 21 and the exhaust valve 22, the injection timing of fuel, the ignition timing, and a waveform of a heat release rate which is generated inside the cylinder 11 by the combustion of the mixture gas in each combustion mode. In FIG. 5, a crank angle progresses from left to right. Below, each combustion mode in the warm state of the engine 1 is described as one example.

1. Homogeneous SI Combustion

When the engine 1 operates in the first range (i.e., in the high-speed range 411 or the high-load/middle-speed range 412), the ECU 10 combusts the mixture gas inside the cylinder 11 by flame propagation. In more detail, the intake S-VT 231 sets the open and close timings of the intake valve 21 to given timings. The intake CVVL 232 sets the lift amount of the intake valve 21 to a given lift amount. The lift amount of the intake valve 21 is substantially the same as the lift amount of the exhaust valve 22 (described later). The exhaust S-VT 241 sets the open and close timings of the exhaust valve 22 to given timings. The intake valve 21 and the exhaust valve 22 both open near an intake top dead center (TDC) (see 701). The exhaust VVL 242 opens and closes the exhaust valve 22 only once. According to this open-and-close mode of the intake valve 21 and the exhaust valve 22, a comparatively large amount of fresh air, and a comparatively small amount of burnt gas are introduced into the cylinder 11. Basically, the burnt gas is internal EGR gas which remains inside the cylinder 11.

The injector 6 injects fuel into the cylinder 11 during an intake stroke (see 702). The injector 6 may inject fuel all at once as illustrated in FIG. 5. The fuel injected into the cylinder 11 is spread by a strong intake flow, and the mixture gas at a homogeneous fuel concentration is formed inside the cylinder 11. A mass ratio of the mixture gas (i.e., a mass ratio G/F of intake air inside the cylinder 11 containing burnt gas to fuel) is about 20:1. Note that a mass ratio A/F of fresh air inside the cylinder 11 to fuel is a stoichiometric air fuel ratio.

The first spark plug 251 and the second spark plug 252 are both actuated to ignite the mixture gas near a compression TDC (see 703). The first spark plug 251 and the second spark plug 252 may ignite the mixture gas simultaneously or at different timings.

After the ignition by the first spark plug 251 and the second spark plug 252, the mixture gas combusts by flame propagation (see 704). In the high-speed range 411 where the speed is too high for the CI combustion, and in the high-load/middle-speed range 412 where the load is too high for the CI combustion, the engine 1 can operate while securing combustion stability and reducing abnormal combustion.

Since the homogeneous mixture gas is combusted by jump spark ignition in this combustion mode, this mode may be referred to as the "homogeneous SI combustion."

2. Retarded SI Combustion

When the engine 1 operates in the second range (i.e., in the first high-load/low-speed range 413 or the second high-load/low-speed range 414), the ECU 10 combusts the mixture gas inside the cylinder 11 by flame propagation. In more detail, when the engine 1 operates in the second high-load/low-speed range 414, the intake S-VT 231 sets the open and close timings of the intake valve 21 to given timings. The intake CVVL 232 sets the lift amount of the intake valve 21 to a given lift amount. The lift amount of the intake valve 21 is substantially the same as the lift amount of the exhaust valve 22 (described later). The exhaust S-VT 241 sets the open and close timings of the exhaust valve 22 to given timings. The intake valve 21 and the exhaust valve 22 both open near the intake TDC (see 705). The exhaust VVL 242 opens and closes the exhaust valve 22 only once. According to this open-and-close mode of the intake valve 21 and the exhaust valve 22, a comparatively large amount of fresh air, and a comparatively small amount of burnt gas are introduced into the cylinder 11. Basically, the burnt gas is the internal EGR gas which remains inside the cylinder 11. The G/F is about 20:1.

When the engine 1 operates in the first high-load/low-speed range 413, the intake S-VT 231 sets the open and close timings of the intake valve 21 to given timings. The intake CVVL 232 sets the lift amount of the intake valve 21 to be smaller than the lift amount in the second high-load/low-speed range 414. The close timing of the intake valve 21 in the first high-load/low-speed range 413 is advanced from the close timing in the second high-load/low-speed range 414 (see 709). The exhaust S-VT 241 sets the open and close timings of the exhaust valve 22 to given timings. The intake valve 21 and the exhaust valve 22 both open near the intake TDC. The exhaust VVL 242 opens and closes the exhaust valve 22 only once. According to this open-and-close mode of the intake valve 21 and the exhaust valve 22, the amount of fresh air introduced into the cylinder 11 decreases and the amount of burnt gas increases, compared to the mode in the second high-load/low-speed range 414. The G/F in the first high-load/low-speed range 413 is about 25:1, which is leaner than the G/F in the second high-load/low-speed range 414.

Since the load is high and the speed is low in the first high-load/low-speed range 413 and the second high-load/low-speed range 414, abnormal combustion (e.g., preignition and knocking) easily occurs. The injector 6 injects fuel into the cylinder 11 during the compression stroke (see 706 and 710). By retarding the timing of injecting fuel into the cylinder 11, abnormal combustion can be reduced. The injector 6 may inject fuel all at once as illustrated in FIG. 5.

In the second high-load/low-speed range 414 where the load is relatively high, the injector 6 injects fuel into the cylinder 11 at a relatively late timing (see 706). The injector 6 may inject fuel, for example, in a latter half of the combustion stroke or an end period of the compression stroke. Note that the latter half of the compression stroke corresponds to a latter half when the compression stroke is equally divided into two, an early half and a latter half. The end period of the compression stroke corresponds to an end period when the compression stroke is equally divided into three, an early period, a middle period, and an end period. In the second high-load/low-speed range 414 where the load is relatively high, retarding the injection timing of fuel is advantageous to reduce abnormal combustion.

In the first high-load/low-speed range 413 where the load is relatively low, the injector 6 injects fuel into the cylinder 11 at a relatively early timing (see 710). The injector 6 may inject fuel, for example, in the middle period of the compression stroke. The middle period of the compression stroke corresponds to the middle period when the compression stroke is equally divided into three, the early period, the middle period, and the end period.

The fuel injected into the cylinder 11 during the compression stroke is spread by the injection flow. An injection pressure of fuel is preferred to be higher in order to rapidly combust the mixture gas so that abnormal combustion is reduced and combustion stability is improved. The high injection pressure generates a strong flow inside the cylinder 11 at a high pressure near the compression TDC. The strong flow accelerates the flame propagation.

The first spark plug 251 and the second spark plug 252 both ignite the mixture gas near the compression TDC (see 707 and 711). The first spark plug 251 and the second spark plug 252 may ignite the mixture gas simultaneously or at different timings. In the second high-load/low-speed range 414 where the load is relatively high, the first spark plug 251 and the second spark plug 252 perform the ignition at a timing later than the compression TDC in accordance with the retarded injection timing of fuel. After the ignition by the first spark plug 251 and the second spark plug 252, the mixture gas combusts by flame propagation (see 708 and 712).

When the engine 1 is in the operating state where the speed is low and abnormal combustion easily occurs, the engine 1 can operate while securing combustion stability and reducing abnormal combustion. Since the injection timing is retarded in this combustion mode, this combustion mode may be referred to as the "retarded SI combustion." Specifically, the combustion mode in the first high-load/low-speed range 413 may be referred to as a "first retarded SI combustion," and the combustion mode in the second high-load/low-speed range 414 may be referred to as a "second retarded SI combustion."

3. HCCI Combustion

When the engine 1 operates in the third range (i.e., in the low-load range 415), the ECU 10 combusts the mixture gas inside the cylinder 11 by compression ignition. In more detail, when the engine 1 operates in the low-load range 415, the exhaust VVL 242 opens and closes the exhaust valve 22 twice. That is, the exhaust VVL 242 switches the first cam to/from the second cam according to the change in the operation range between the first range and the second range, and the third range. The exhaust valve 22 is opened and closed during the exhaust stroke, and opened and closed also during the intake stroke. The exhaust S-VT 241 sets the open and close timings of the exhaust valve 22 to given timings. The intake S-VT 231 retards the open and close timings of the intake valve 21. The intake CVVL 232 sets the lift amount of the intake valve 21 to be small. The intake valve 21 is closed at the most retarded timing (see 713).

According to this open-and-close mode of the intake valve 21 and the exhaust valve 22, a comparatively small amount of fresh air and a large amount of burnt gas are introduced into the cylinder 11. Basically, the burnt gas is the internal EGR gas which remains inside the cylinder 11. The G/F of the mixture gas is about 40:1. The large amount of internal EGR gas introduced into the cylinder 11 increases the in-cylinder temperature.

The injector 6 injects fuel into the cylinder 11 during the intake stroke (see 714). As described above, the fuel is spread by the strong intake flow, and the homogeneous mixture gas is formed inside the cylinder 11. The injector 6 may inject fuel all at once as illustrated in FIG. 5. Alternatively, the injector 6 may inject fuel dividedly (split injection).

When the engine 1 operates in the low-load range 415, the first spark plug 251 and the second spark plug 252 do not perform the ignition. The mixture gas inside the cylinder 11 is compressed and ignited near the compression TDC (see 715). Since the load of the engine 1 is low and the fuel amount is small, by making the G/F lean, the CI combustion (more accurately, the HCCI combustion) can be achieved while abnormal combustion is reduced. Moreover, by introducing a large amount of internal EGR gas and increasing the in-cylinder temperature, the stability of the HCCI combustion and thermal efficiency of the engine 1 improve.

4. SPCCI Combustion

When the engine 1 operates in the fourth range (in detail, in the first middle-load range 416), the ECU 10 combusts part of mixture gas inside the cylinder 11 by flame propagation, and combusts the remaining mixture gas by compression ignition. In more detail, the exhaust S-VT 241 sets the open and close timings of the exhaust valve 22 to given timings. The exhaust VVL 242 opens and closes the exhaust valve 22 twice (see 716). Internal EGR gas is introduced into the cylinder 11. The intake CVVL 232 sets the lift amount of the intake valve 21 to be larger than the lift amount in the low-load range 415. The close timing of the intake valve 21 is substantially the same as the close timing in the low-load range 415. The open timing of the intake valve 21 is advanced from the open timing in the low-load range 415. According to this open-and-close mode of the intake valve 21 and the exhaust valve 22, the amount of fresh air introduced into the cylinder 11 increases and the introducing amount of burnt gas decreases. The G/F of the mixture gas is 35:1, for example.

The injector 6 injects fuel into the cylinder 11 during the compression stroke (see 717). The injector 6 may perform the injection all at once as illustrated in FIG. 5. Similarly to the retarded SI combustion, retarding the fuel injection is advantageous to reduce abnormal combustion. Note that for example, when the engine 1 operates at a low load in the first middle-load range 416, fuel may be injected during each of the intake stroke and the compression stroke.

The first spark plug 251 and the second spark plug 252 both ignite the mixture gas near the compression TDC (see 718). The mixture gas starts the flame propagation combustion near the compression TDC after the ignition by the first spark plug 251 and the second spark plug 252. The heat generated by the flame propagation combustion increases the temperature inside the cylinder 11, and the flame propagation increases the pressure inside the cylinder 11. Accordingly, unburnt mixture gas self-ignites, for example, after the compression TDC, and starts the CI combustion. After the start of the CI combustion, the flame propagation combustion and the CI combustion progress in parallel. The waveform of the heat release rate may have two peaks as illustrated in FIG. 5 (see 719).

Variations in the temperature inside the cylinder 11 before the start of the compression can be reduced by controlling the heat release amount in the flame propagation combustion. The heat release amount in the flame propagation combustion can be adjusted by the ECU 10 controlling the ignition timing. Accordingly, the mixture gas self-ignites at a target timing. In the SPCCI combustion, the ECU 10 controls the timing of the compression ignition by controlling the ignition timing. Since the spark ignition controls the compression ignition in this combustion mode, this combustion mode may be referred to as the "SPark Controlled Compression Ignition (SPCCI) combustion."

5. MPCI Combustion

When the engine 1 operates in the second middle-load range 417, the ECU 10 combusts the mixture gas inside the cylinder 11 by compression ignition. In more detail, the exhaust S-VT 241 sets the open and close timings of the exhaust valve 22 to given timings. The exhaust VVL 242 opens and closes the exhaust valve 22 twice. Internal EGR gas is introduced into the cylinder 11. The intake CVVL 232 sets the lift amount of the intake valve 21 to be smaller than the lift amount in the first middle-load range 416. The close timing of the intake valve 21 is substantially the same as the close timing in the first middle-load range 416. The open timing of the intake valve 21 is retarded from the open timing in the first middle-load range 416 (see 720 and 724). According to this open-and-close mode of the intake valve 21 and the exhaust valve 22, the amount of fresh air introduced into the cylinder 11 decreases and the introducing amount of burnt gas increases. The G/F of the mixture gas is between 35:1 and 38:1, for example.

The injector 6 injects fuel into the cylinder 11 during each of the intake stroke and the compression stroke. The injector 6 performs split injection. In the second middle-load range 417, the ECU 10 changes the injection mode between a squish injection and a trigger injection. The squish injection is a mode in which fuel is injected during the intake stroke and during the middle period of the compression stroke (see 721 and 722). The trigger injection is a mode in which fuel is injected during the intake stroke and during the end period of the compression stroke (see 725 and 726).

The squish injection slows down the CI combustion. As described above, the fuel injected during the intake stroke is spread inside the cylinder 11 by the strong intake flow and the homogeneous mixture gas is formed inside the cylinder 11. As illustrated in the lower part of FIG. 2, the fuel injected in the middle period of the compression stroke reaches a squish area 171 outside of the cavity 31. The squish area 171 is low in temperature since it is located near a cylinder liner, and the temperature further drops due to latent heat during vaporization of fuel spray. The temperature inside the cylinder 11 locally drops, and the mixture gas becomes inhomogeneous inside the cylinder 11. As a result, for example, when the in-cylinder temperature is high, the mixture gas is compressed and ignited at a desired timing while reducing abnormal combustion (see 723). The squish injection allows comparatively slow CI combustion.

Each shaded rectangle in FIG. 5 indicates the injection period of the injector 6, and the area of the rectangle corresponds to the injection amount of fuel. In the squish injection, the injection amount of fuel during the compression stroke is larger than the injection amount of fuel during the intake stroke. Since the fuel is injected toward a large area outside of the cavity 31, generation of smoke can be reduced even when the amount of fuel is large. The temperature decreases as the amount of fuel increases. The injection amount of fuel during the compression stroke may be set to an amount capable of achieving a demanded decrease in the temperature.

Figure 6:
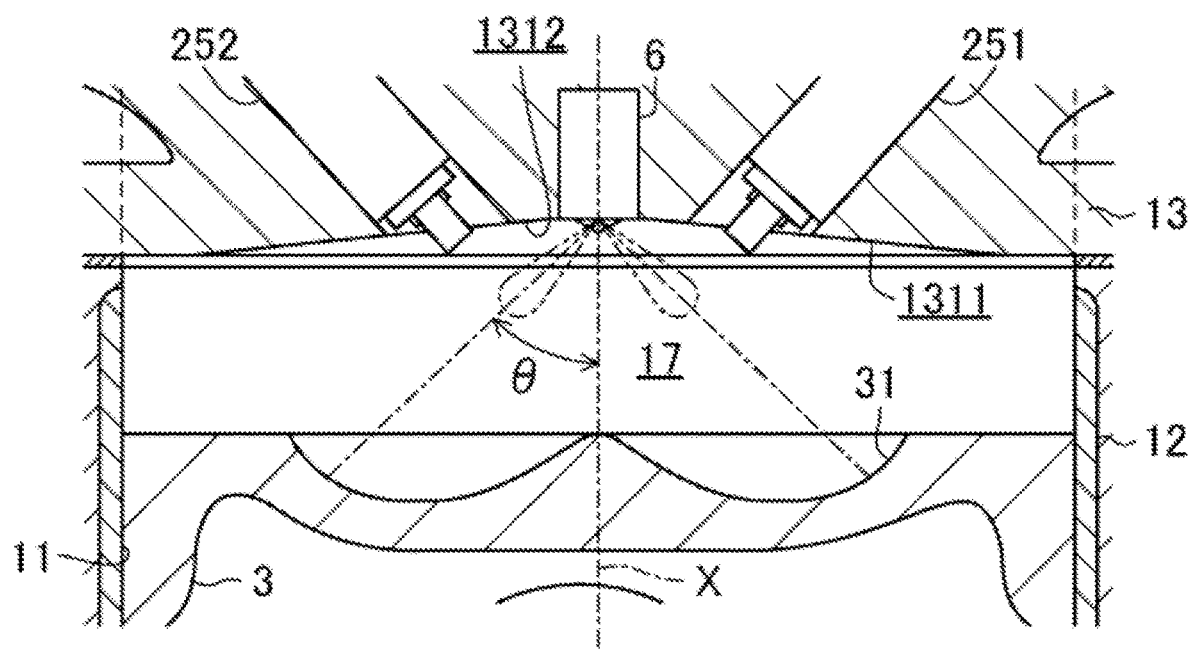
FIG. 6 is a view illustrating a state where fuel is injected into the cylinder in an end period of the compression stroke.

The trigger injection accelerates the CI combustion. As described above, the fuel injected during the intake stroke is spread inside the cylinder 11 by the strong intake flow and the homogeneous mixture gas is formed inside the cylinder 11. As illustrated in FIG. 6, the fuel injected in the end period of the compression stroke is difficult to spread due to the high pressure, and stays in an area inside the cavity 31. Note that the "area inside the cavity 31" means an area inward of an outer peripheral edge of the cavity 31 in the radial direction of the cylinder 11. The internal part of the cavity 31 dented from the top surface of the piston 3 is also included in the area inside of the cavity 31. The mixture gas inside the cylinder 11 is inhomogeneous. Moreover, the temperature at the central part of the cylinder 11 is high since it is far from the cylinder liner. Since a lump of mixture gas at a high fuel concentration is formed in the area at the high temperature, the compression ignition of the mixture gas is accelerated. As a result, for example, when the G/F of the mixture gas is high, the mixture gas is promptly compressed and ignited after the fuel injection during the compression stroke (see 727), and the CI combustion can be accelerated. The trigger injection enhances combustion stability.

In the trigger injection, the injection amount of fuel during the compression stroke is smaller than the injection amount of fuel during the intake stroke. Since the fuel injection during the compression stroke is performed in the end period of the compression stroke, the injected fuel stays inside the cavity 31 and is difficult to spread. Reducing the fuel amount can suppress the generation of smoke. The injection amount of fuel during the compression stroke can be set to an amount capable of achieving both of the demanded acceleration of the compression ignition and the reduction in the generation of smoke.

The squish injection and the trigger injection both make the mixture gas inside the cylinder 11 inhomogeneous. In this respect, it is different from the HCCI combustion in which the homogeneous mixture gas is formed. Both of the squish injection and the trigger injection can control the timing of the compression ignition by forming the inhomogeneous mixture gas.

Since the injector 6 injects fuel a plurality of times in this combustion mode, this mode may be referred to as the "Multiple Premixed fuel injection Compression Ignition (MPCI) combustion."

Note that as illustrated in the second base map 402 in FIG. 4, the homogeneous SI combustion or the SPCCI combustion is performed in the third range when the engine 1 is cold (the third range corresponds to the range of the first base map 401 for the warm state, in which the combustion modes are the HCCI, the MPCI, and the SPCCI). This is because the CI combustion becomes instable when the temperature of the engine 1 is low. After the start-up of the engine 1, the ECU 10 changes the base map from the second base map 402 for the cold state to the first base map 401 for the warm state as the coolant temperature rises. When the base map is changed, the ECU 10 may change the combustion mode, for example, from the homogeneous SI combustion to the HCCI combustion even when the speed and the load of the engine 1 do not change. (Details of Engine Control According to Engine Load)

Here, in the timing charts of the combustion modes illustrated in FIG. 5, the combustion modes illustrated in the lower part of the figure are the modes when the load of the engine 1 is lower, and the combustion modes illustrated in the upper part of the figure are the modes when the engine load is higher. The G/F of the mixture gas is low when the engine load is high. On the other hand, the G/F of the mixture gas is high when the engine load is low. The amount of fresh air introduced into the cylinder 11 is small and the amount of burnt gas is large.

Figure 7:
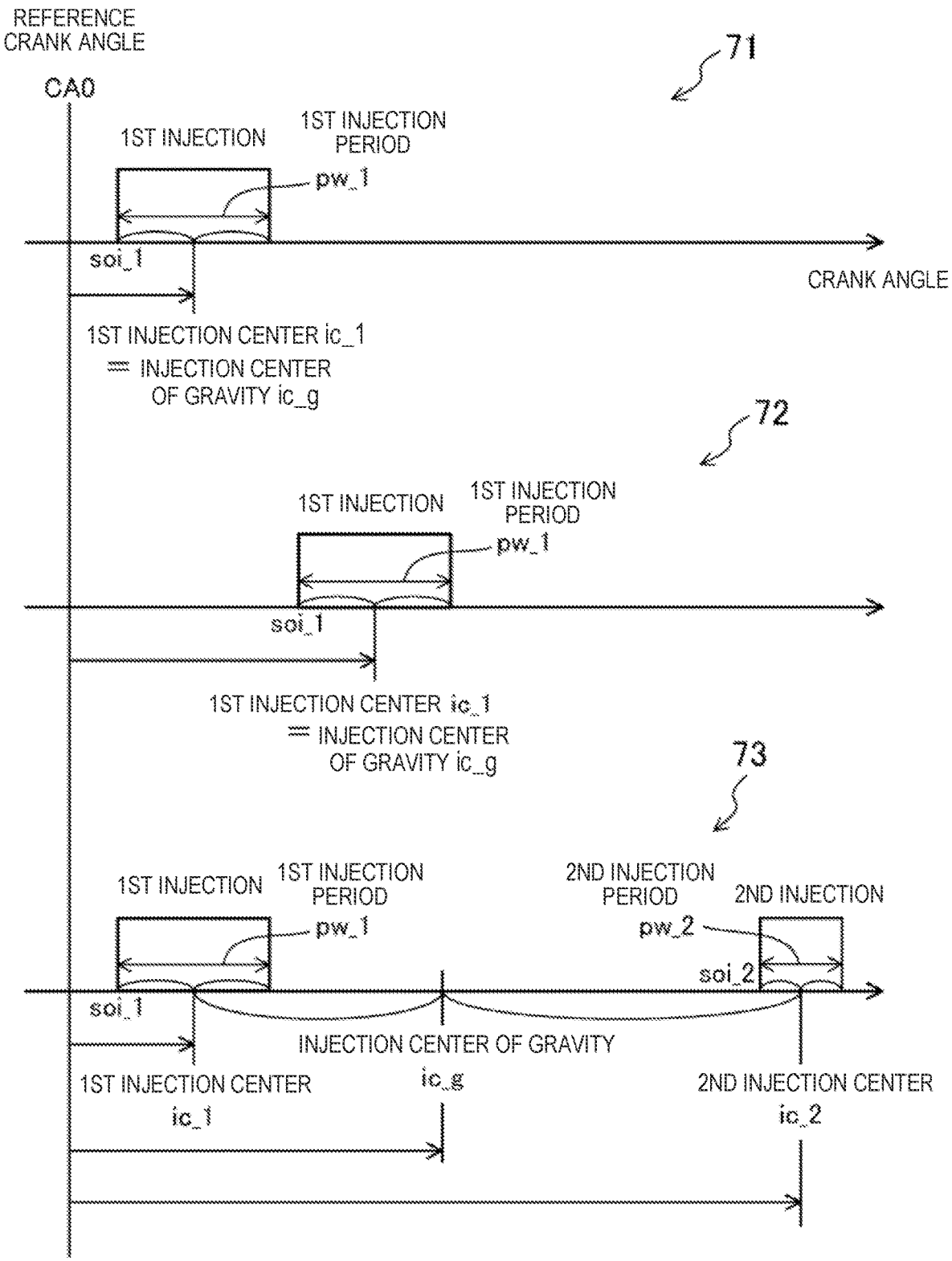
FIG. 7 is a view illustrating a definition of an injection center of gravity.

Next, the injection timings of fuel corresponding to the change in the engine load are compared. Here, an injection center of gravity related to the injection timing of fuel is defined. FIG. 7 is a view illustrating the injection center of gravity. The horizontal axis in FIG. 7 indicates the crank angle, and the crank angle progresses from left to right in the figure. The injection center of gravity is the center of mass of fuel injected in one cycle with respect to the crank angle. The injection center of gravity is defined based on the injection timing and the injection amount of fuel in one cycle. Chart 71 in FIG. 7 illustrates an injection timing soi1 (start of injection) and an injection period pw_1 in a case where the fuel is injected all at once (first injection). A left end of each rectangle in FIG. 7 indicates a start timing of the injection, a right end indicates an end timing of the injection, and a length between the left and right ends of the rectangle indicates the injection period. The injection pressure of fuel is constant during one combustion cycle. Therefore, the injection amount is in proportion to the injection period. The injection amount may be substituted by the injection period when the injection center of gravity is calculated.

An injection center of gravity ic_g when the fuel is injected all at once coincides with a crank angle ic_1 at the middle of the one injection period. The crank angle ic_1 (i.e., the injection center of gravity ic_g) can be represented by the following Equation (1) based on the injection start timing soi1, the injection period pw_1, and a speed Ne of the engine 1.

$$ic\_1 = soi\_1 + (pw\_1 * Ne * 360/60)/2 = soi\_1 + 3 * pw\_1 * Ne \qquad (1)$$

Chart 72 in FIG. 7 illustrates a case where the start timing of the injection is retarded from the case in chart 71. Since fuel is injected all at once also in chart 72, the injection center of gravity can be calculated based on Equation (1). In the case where fuel is injected all at once, the injection center of gravity retards as the start timing of the injection is retarded.

Note that although illustration is omitted, the injection center of gravity changes when the injection start timing is the same and the injection period changes.

Chart 73 in FIG. 7 illustrates a case of the split injection. The injection timing and the injection period of the first injection in chart 73 are the same as the injection timing and the injection period of the first injection in chart 71. A start timing of a second injection is later than the start timing of the first injection.

When the injection includes two injections (first and second injections), since the injection center of gravity ic_g is the center of mass of fuel injected in one cycle with respect to the crank angle, the injection center of gravity ic_g is defined on the basis of the following Equation (2).

$$ic\_g = (pw\_1 * ic\_1 + pw\_2 * ic\_2)/(pw\_1 + pw\_2) \qquad (2)$$

The "ic_1" can be calculated based on Equation (1). Similarly, "ic_2" can be calculated based on the following Equation (3).

$$ic\_2 = soi\_2 + (pw\_2 * Ne * 360/60)/2 = soi\_2 + 3 * pw\_2 * Ne \quad (3)$$

On the basis of Equations (1), (2), and (3), the injection center of gravity ic_g can be calculated based on the following Equation (4).

$$ic\_g = (pw\_1 * (soi\_1 + 3 * pw\_1 * Ne) + pw\_2 * (soi\_2 + 3 * pw\_2 * Ne))/(pw\_1 + pw\_2) \quad (4)$$

Since the second injection is added to the first injection in chart 73 in FIG. 7, the injection center of gravity ic_g in chart 73 is retarded from the injection center of gravity ic_g in chart 71.

Note that, when Equation (4) is generalized and the injector 6 injects fuel "n" times in one cycle, the injection center of gravity ic_g can be calculated based on the following Equation (5).

$$ic\_g = (pw\_1 * (soi\_1 + 3 * pw\_1 * Ne) + \ldots + pw\_n * (soi\_n + 3 * pw\_n * Ne))/(pw\_1 + \ldots + pw\_n) \quad (5)$$

As illustrated in FIG. 5, the G/F of the mixture gas is high (e.g., G/F=40:1) when the load of the engine 1 is low. The injector 6 injects fuel during the intake stroke. The injection center of gravity is on the advanced side. When the load of the engine 1 is higher, the G/F of the mixture gas is lower (e.g., G/F=35:1 or 38:1). The injector 6 injects fuel during the intake stroke and during the compression stroke (see 721, 722, 725, and 726). The injection center of gravity is relatively retarded.

When the load of the engine 1 is further higher, the G/F of the mixture gas is further lower (e.g., G/F=35:1). The injector 6 injects fuel during the compression stroke (see 717). The injection center of gravity is further retarded relatively.

When the load of the engine 1 is further higher, the G/F of the mixture gas is further lower (e.g., G/F=20:1 or 25:1). The injector 6 injects fuel during the intake stroke (see 702), or during the compression stroke (see 706 and 710). The injection center of gravity is relatively advanced, or relatively retarded.

When comparing the HCCI combustion with the homogeneous SI combustion and the retarded SI combustion, the G/F of the mixture gas is higher in the HCCI combustion, and the G/F of the mixture gas is lower in the homogeneous SI combustion and the retarded SI combustion. Suppose that the engine 1 is an engine which switches only between the HCCI combustion, and the homogeneous SI combustion or the retarded SI combustion. In this case, when the combustion mode is switched corresponding to the change in the load of the engine 1, the G/F of the mixture gas needs to be changed largely. However, the responsivity of the variable valve operating device including the intake S-VT 231, the intake CVVL 232, the exhaust S-VT 241, and the exhaust VVL 242 is not so high. Therefore, it is difficult to instantly change the G/F of the mixture gas.

In the MPCI combustion and the SPCCI combustion, the G/F of the mixture gas is between the G/F for the HCCI combustion and the G/F for the SI combustion (i.e., at the middle G/F). The G/F can be changed promptly between the HCCI combustion, and the MPCI combustion or the SPCCI combustion, and between the SI combustion, and the MPCI combustion or the SPCCI combustion.

As will be described later in detail, in the MPCI combustion and the SPCCI combustion, the injection center of gravity is retarded from the injection center of gravity in the HCCI combustion. Therefore, the MPCI combustion and the SPCCI combustion are the modes capable of securing combustion stability and reducing abnormal combustion when the mixture gas is at the middle G/F. This engine 1 can seamlessly switch the combustion mode between the SI combustion, the HCCI combustion, the MPCI combustion, and the SPCCI combustion by promptly changing the G/F of the mixture gas corresponding to the change in the engine load. As a result, securing combustion stability and reducing abnormal combustion can be achieved over the entire load range of the engine 1.

Note that in the MPCI combustion, the injector 6 injects fuel during the intake stroke and during the compression stroke. When the G/F of the mixture gas is between the G/F for the HCCI combustion and the G/F for the SI combustion, the injector 6 may inject fuel all at once such that the injection center of gravity is retarded from the injection center of gravity in the HCCI combustion, instead of the split injection. When the injection center of gravity is retarded, a period of time from the fuel injection to the ignition becomes shorter, and thus, the mixture gas inside the cylinder 11 does not become homogeneous. Such inhomogeneous mixture gas enables the securing of combustion stability and the reduction in abnormal combustion at the middle G/F.

(Modifications of Open-and-close Mode of Intake Valve and Exhaust Valve)

Although FIG. 5 illustrates the configuration in which the exhaust VVL 242 opens the exhaust valve 22 during each of the exhaust stroke and the intake stroke, the configuration of the variable valve operating device is not limited to the configuration. Next, modifications of the variable valve operating device are described with reference to FIG. 8.

Figure 8:
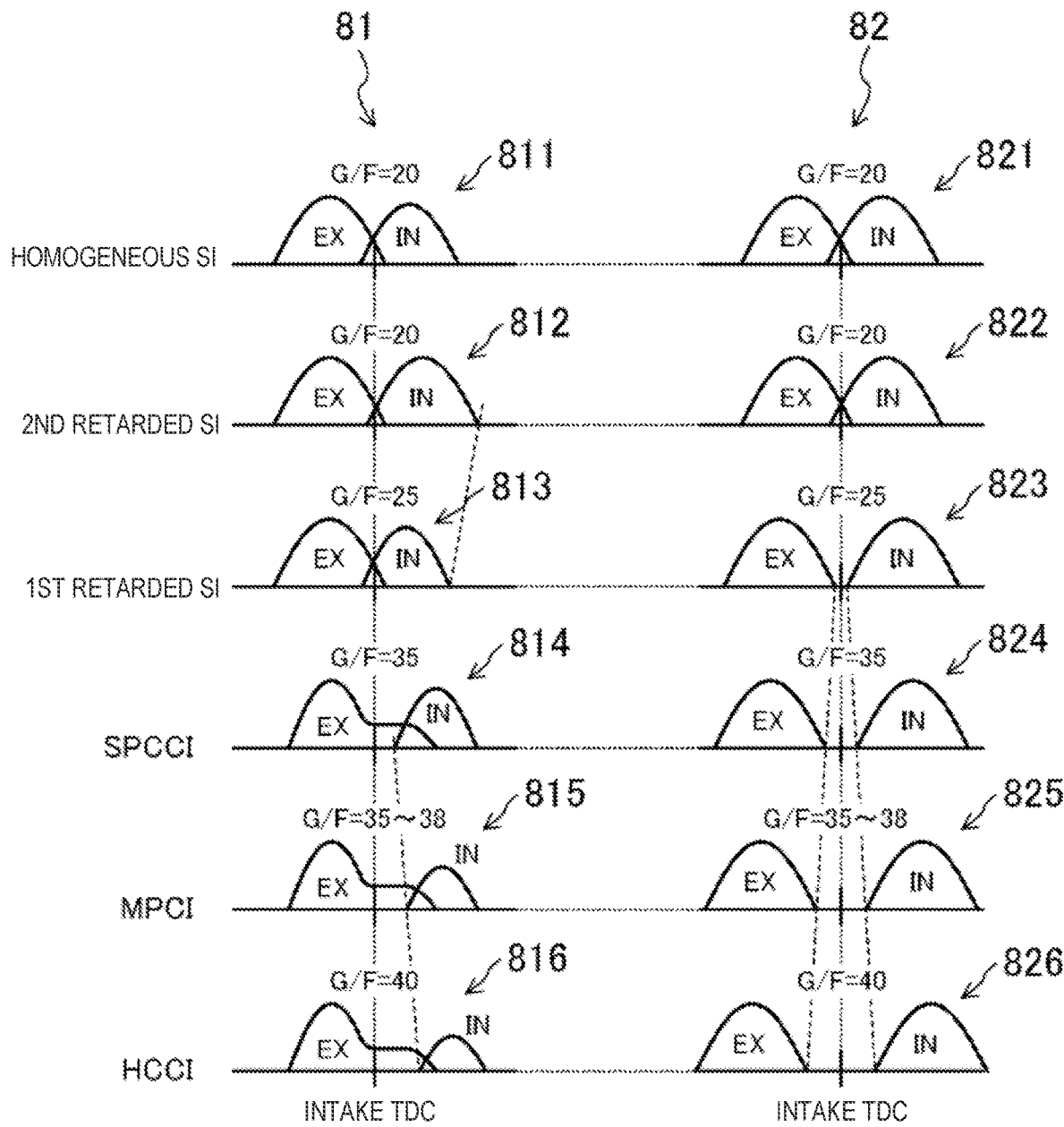
FIG. 8 illustrates a modification of the open and close operations of the intake valve and the exhaust valve in each combustion mode.

In FIG. 8, "81" illustrates lift curves of the exhaust valve 22, which are different from the lift curves illustrated in FIG. 5. A lift curve 811 in the homogeneous SI combustion, a lift curve 812 in the second retarded SI combustion, a lift curve 813 in the first retarded SI combustion are the same as the lift curves 701, 705, and 709 in FIG. 5, respectively. A lift curve 814 in the SPCCI combustion, a lift curve 815 in the MPCI combustion, and a lift curve 816 in the HCCI combustion are different from the lift curves 716, 720, 724, and 713 in FIG. 5. As indicated by 814, 815, and 816 in FIG. 8, after the exhaust valve 22 is opened during the exhaust stroke and the lift amount gradually decreases from the maximum lift, the exhaust valve 22 is not closed and maintains a given lift amount. The exhaust valve 22 is not closed until a given timing after the intake TDC during the intake stroke. Maintaining the open state of the exhaust valve 22 without closing is advantageous for loss reduction of the engine 1. Note that lift curves of the intake valve 21 in the lift curve 814 in the SPCCI combustion, the lift curve 815 in the MPCI combustion, and the lift curve 816 in the HCCI combustion are the same as the lift curves 716, 720, 724, and 713 in FIG. 5, respectively.

In FIG. 8, "82" illustrates still other lift curves of the exhaust valve 22. In this modification, the variable valve operating device is not provided with the intake CVVL 232 and the exhaust VVL 242. The variable valve operating device is provided with the intake S-VT 231 and the exhaust S-VT 241, and changes the open and close timings of the intake valve 21 and the exhaust valve 22.

As indicated by 823, 824, 825, and 826, a negative overlap period during which both of the intake valve 21 and the exhaust valve 22 are closed having the intake TDC therebetween, is provided so that internal EGR gas remains inside the cylinder 11. That is, the exhaust valve 22 is closed before the intake TDC.

When the load of the engine 1 decreases and the amount of burnt gas introduced into the cylinder 11 is to be increased, the close timing of the exhaust valve 22 advances. Moreover, when the amount of fresh air introduced into the cylinder 11 is to be reduced, the close timing of the intake valve 21 retards after an intake bottom dead center (BDC) to be separated therefrom. The negative overlap period is increased as the load of the engine 1 is lower.

Note that the variable valve operating device may provide a positive overlap period, such as at 821 and 822, during which both of the intake valve 21 and the exhaust valve 22 are opened having the intake TDC therebetween so that internal EGR gas is reintroduced into the cylinder 11.

(Determination of Combustion Mode)

The ECU 10 determines the operating state of the engine 1 based on the measurement signals of the sensors SW1 to SW10 described above. The ECU 10 controls the intake S-VT 231, the intake CVVL 232, the exhaust S-VT 241, and the exhaust VVL 242 according to the determined operating state. The intake S-VT 231, the intake CVVL 232, the exhaust S-VT 241, and the exhaust VVL 242 control the opening and closing of the intake valve 21 and the exhaust valve 22 based on the control signals received from the ECU 10. Accordingly, the filling amount of intake air inside the cylinder 11 is adjusted. In more detail, the amount of fresh air and burnt gas introduced into the cylinder 11 is adjusted.

The ECU 10 also adjusts the injection amount and timing of fuel according to the operating state of the engine 1. The injector 6 injects fuel into the cylinder 11 in a specified amount at a specified timing based on the control signal received from the ECU 10.

The ECU 10 also controls the first spark plug 251 and the second spark plug 252 according to the operating state of the engine 1. The first spark plug 251 and the second spark plug 252 ignite the mixture gas at a specified timing based on the control signal received from the ECU 10. The ECU 10 may not output the control signal to the first spark plug 251 and the second spark plug 252. In this case, the first spark plug 251 and the second spark plug 252 are inhibited from igniting the mixture gas.

As described above, the engine 1 operates while switching the combustion mode between the plurality of types of combustion modes according to the operating state of the engine 1. Therefore, securing combustion stability and reducing abnormal combustion can be achieved over the entire wide operation range.

Figure 9:
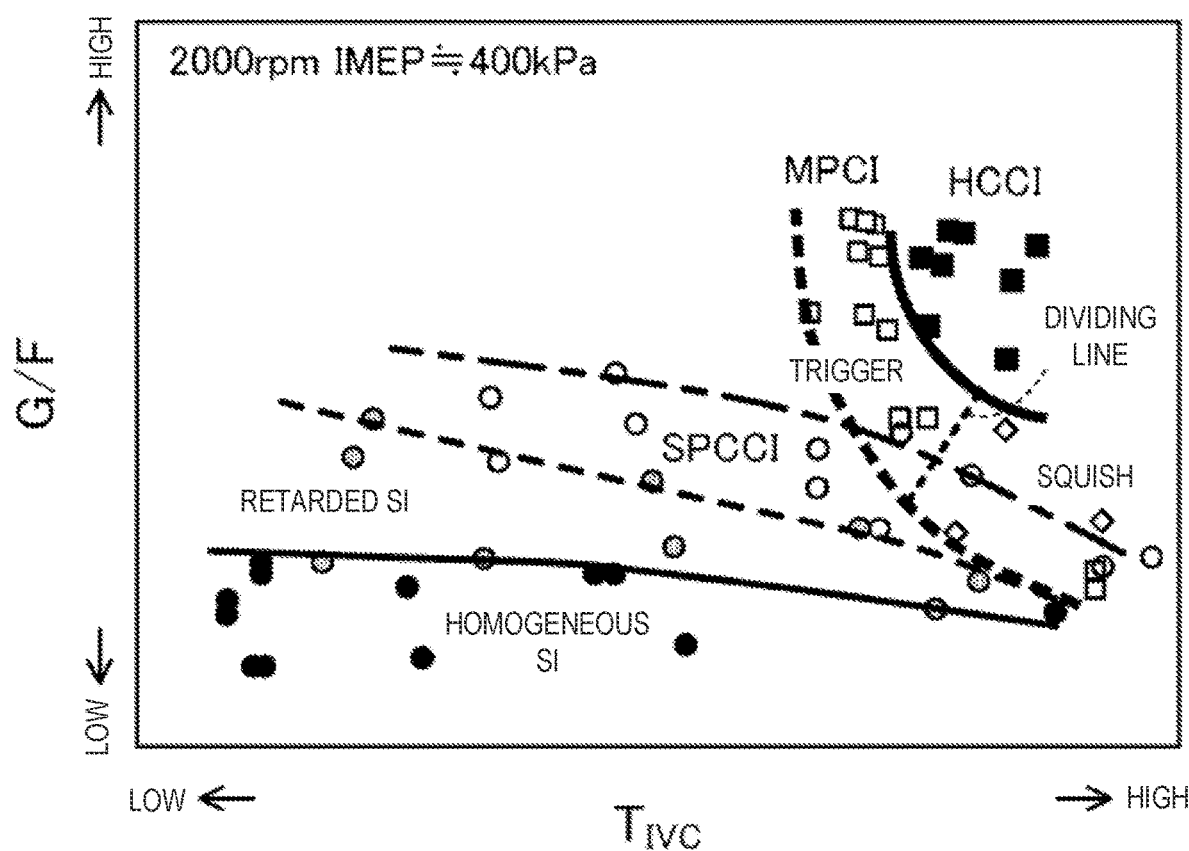
FIG. 9 is a view illustrating ranges defined based on a G/F and a $T_{IVC}$, within which each combustion mode is achieved.

FIG. 9 illustrates a relationship between the G/F of the mixture gas and an in-cylinder temperature $T_{IVC}$ in each combustion mode, at which the securing of combustion stability and the reduction in abnormal combustion are achieved. To be accurate, the in-cylinder temperature $T_{IVC}$ is an in-cylinder temperature when the intake valve 21 is closed. Moreover, FIG. 9 illustrates an example when the speed of the engine 1 is 2,000 rpm, and an IMEP (Indicated Mean Effective Pressure) is about 400 kPa.

1. Homogeneous SI Combustion

The homogeneous SI combustion can secure combustion stability and reduce abnormal combustion when the G/F is relatively low. As the G/F increases (i.e., as the G/F becomes leaner), the combustion period of the mixture gas becomes longer. Even if the ignition timing is advanced to shorten the combustion period, combustion stability cannot be secured when the G/F is too high. That is, the maximum G/F at which the homogeneous SI combustion is possible exists (see a solid line in FIG. 9).

Moreover, when the $T_{IVC}$ becomes high due to the increase in the internal EGR gas, the combustion period becomes longer as a result of the deceleration in the combustion. The combustion period can be shortened by advancing the ignition timing until the $T_{IVC}$ reaches a certain temperature. When the $T_{IVC}$ is further increased, abnormal combustion is likely to be caused. Even if the ignition timing is retarded to reduce abnormal combustion, the ignition timing becomes too late when the $T_{IVC}$ becomes too high, and thus, combustion stability cannot be secured. That is, the maximum in-cylinder temperature $T_{IVC}$ at which the homogeneous SI combustion is possible exists.

2. HCCI Combustion

The HCCI combustion can secure combustion stability and reduce abnormal combustion when the G/F is relatively high and the in-cylinder temperature $T_{IVC}$ is relatively high. As the G/F decreases (i.e., as the G/F becomes richer), the CI combustion becomes too intense, which leads to abnormal combustion. Even if the $T_{IVC}$ is lowered to retard the ignition timing and decelerate the combustion, combustion stability degrades when the $T_{IVC}$ becomes too low. That is, the minimum G/F and the minimum in-cylinder temperature $T_{IVC}$ at which the HCCI combustion is possible exist (see a thicker solid line in FIG. 9).

As is apparent from FIG. 9, the "G/F-$T_{IVC}$ range" where the homogeneous SI combustion is possible, and the "G/F-$T_{IVC}$ range" where the HCCI combustion is possible are separated from each other. As described above, suppose that the engine 1 switches only between the homogeneous SI combustion and the HCCI combustion corresponding to the change in the load of the engine 1, the G/F of the mixture gas and the in-cylinder temperature $T_{IVC}$ need to be changed largely corresponding to the switching of the combustion mode. The G/F of the mixture gas and the in-cylinder temperature $T_{IVC}$ are adjusted mainly by the adjustment of the filling amount of intake air. However, it is difficult to instantly change the G/F of the mixture gas and the in-cylinder temperature $T_{IVC}$ corresponding to the switching of the combustion mode, because of a response delay of the intake S-VT 231, the intake CVVL 232, the exhaust S-VT 241, and the exhaust VVL 242.

3. Retarded SI Combustion

As described above, when the G/F of the mixture gas is made leaner, or the in-cylinder temperature $T_{IVC}$ is made higher than the operable range of the homogeneous SI combustion, combustion stability cannot be secured. In the retarded SI combustion, as described above, the injector 6 injects fuel into the cylinder 11 near the compression TDC, that is, before the ignition by the first spark plug 251 and the second spark plug 252. Since the fuel is not injected into the cylinder 11 until immediately before the ignition, preignition can be avoided.

The injection of fuel near the compression TDC causes the flow inside the cylinder 11, and after the ignition by the first spark plug 251 and the second spark plug 252, the flame is promptly propagated by the flow. Accordingly, the rapid combustion is achieved, and combustion stability can be secured while reducing knocking. In the "G/F-$T_{IVC}$ range" where the retarded SI combustion is possible, the G/F of the mixture gas is higher than that in the "G/F-$T_{IVC}$ range" where the homogeneous SI combustion is possible (see a broken line in FIG. 9). The retarded SI combustion extends its operable range in the leaner-G/F side compared to the homogeneous SI combustion.

4. SPCCI Combustion

When the G/F of the mixture gas is made further leaner, or the in-cylinder temperature $T_{IVC}$ is made further higher than the operable range of the retarded SI combustion, gentle CI combustion (different from knocking) starts after the flame propagation combustion started by the ignition of the first spark plug 251 and the second spark plug 252. In the SPCCI combustion including the controlled CI combustion, the G/F is higher than the "G/F-$T_{IVC}$ range" where the retarded SI combustion is possible (see a one-dot chain line in FIG. 9). The SPCCI combustion extends its operable range in the leaner-G/F side compared to the homogeneous SI combustion and the retarded SI combustion. However, a large gap still exists between the "G/F-$T_{IVC}$ range" of the SPCCI combustion and the "G/F-$T_{IVC}$ range" of the HCCI combustion.

5. MPCI Combustion

The MPCI combustion extends its operable range in the richer-G/F side and the lower-$T_{IVC}$ side, compared to the operable range of the HCCI combustion.

First, when the G/F of the mixture gas is made richer than the operable range of the HCCI combustion, the CI combustion becomes intense, which leads to abnormal combustion. In order to decelerate the CI combustion, fuel is injected into the cylinder 11 in the middle period of the compression stroke in the squish injection of the MPCI combustion. As described above, the injected fuel reaches the squish area 171 outside of the cavity 31, and locally increases the fuel concentration at the squish area 171 and decreases the temperature. As a result, the timing of the compression ignition is retarded, and the combustion is slowed down. The squish injection extends its operable range mainly in the richer-G/F side compared to the operable range of the HCCI combustion.

Next, when the $T_{IVC}$ is made lower than the operable range of the HCCI combustion, the compression ignition timing retards and the combustion becomes too slow, which lowers combustion stability. In order to advance the compression ignition timing, fuel is injected into the cylinder 11 in the end period of the compression stroke in the trigger injection of the MPCI combustion. As described above, the injected fuel does not spread and forms the lump of mixture gas at a high fuel concentration inside the cavity 31. As a result, the compression ignition starts promptly after the fuel injection, and the surrounding homogeneous mixture gas also promptly combusts by self-ignition. The trigger injection extends its operable range mainly in the lower-$T_{IVC}$ side compared to the operable range of the HCCI combustion.

Part of the "G/F-$T_{IVC}$ range" of the MPCI combustion overlaps with the "G/F-$T_{IVC}$ range" of the SPCCI combustion. The gap between the "G/F-$T_{IVC}$ ranges" of the homogeneous SI combustion and the retarded SI combustion, and the "G/F-$T_{IVC}$ range" of the HCCI combustion is filled.

Here, the "G/F-$T_{IVC}$ range" of the MPCI combustion is divided into the ranges where the squish injection is performed and where the trigger injection is performed (see a broken dividing line in FIG. 9). In the range where the squish injection is performed in the "G/F-$T_{IVC}$ range" of the MPCI combustion, the G/F is relatively low and the $T_{IVC}$ is relatively high. On the other hand, in the range where the trigger injection is performed in the "G/F-$T_{IVC}$ range" of the MPCI combustion, the G/F is relatively high and the $T_{IVC}$ is relatively low.

(Operation Control of Engine)

The ECU 10 adjusts the G/F of the mixture gas and the in-cylinder temperature $T_{IVC}$ based on the base map illustrated in FIG. 4 such that the combustion mode corresponding to the demanded load and speed of the engine 1 is achieved.

However, the G/F of the mixture gas and/or the in-cylinder temperature $T_{IVC}$ may not correspond to the operating state of the engine 1, and may be deviated from the target G/F and/or the target in-cylinder temperature $T_{IVC}$ due to, for example, the response delay of the variable valve operating device. When the G/F of the mixture gas and/or the in-cylinder temperature $T_{IVC}$ are deviated from the target G/F and/or the target in-cylinder temperature $T_{IVC}$, the mixture gas cannot be combusted in the intended combustion mode, which may lower combustion stability and/or cause abnormal combustion. In this respect, the ECU 10 temporarily sets the combustion mode according to the operation state of the engine 1, determines the target G/F and/or the target in-cylinder temperature $T_{IVC}$, and controls the variable valve operating device. Moreover, the ECU 10 switches the combustion mode according to an actual G/F and/or an actual in-cylinder temperature $T_{IVC}$ (accurately, an estimated G/F and/or an estimated in-cylinder temperature $T_{IVC}$), and adjusts the injection timing of fuel and whether or not to perform the ignition.

Figure 10:
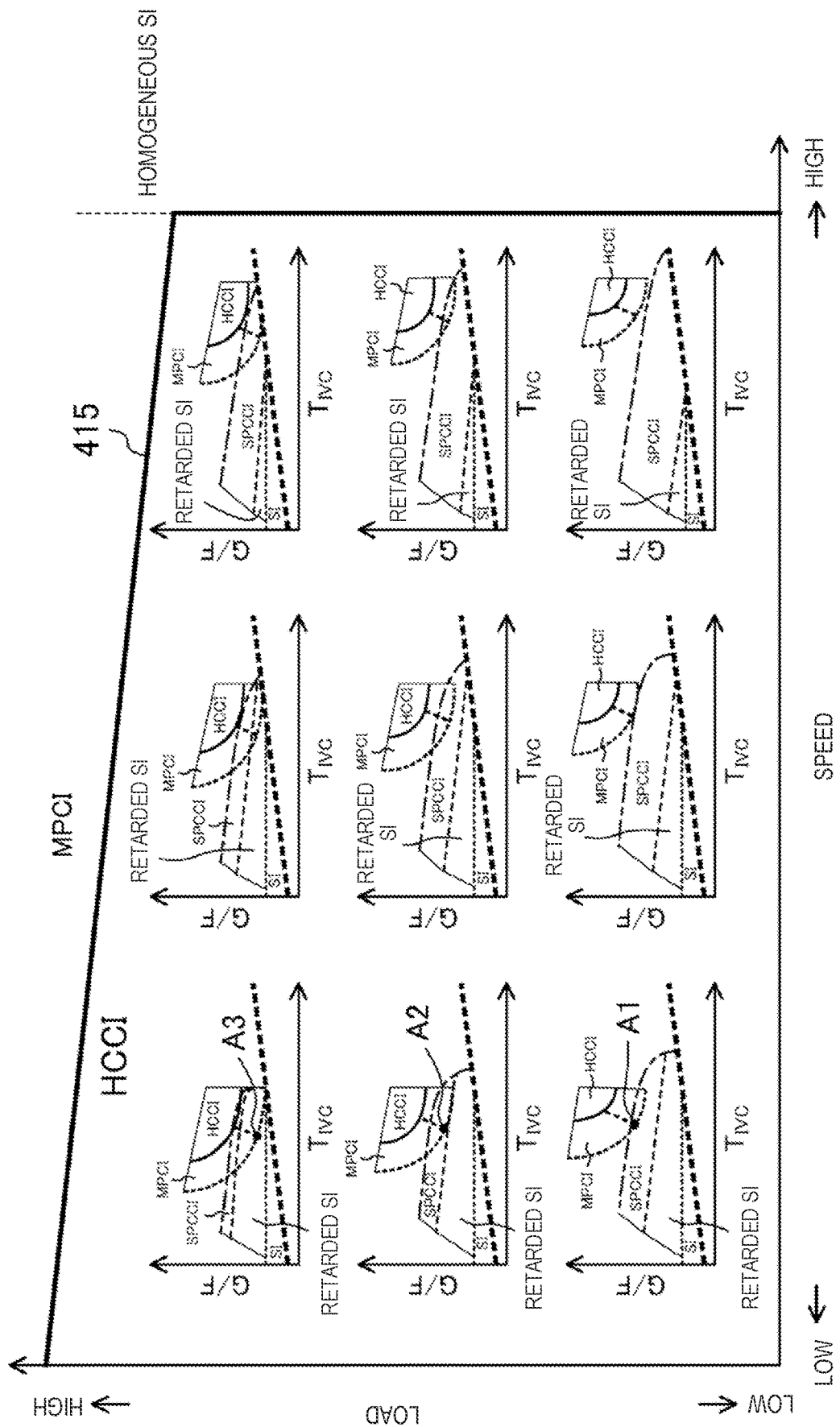
FIG. 10 is a view illustrating a selection map of the combustion mode in a low-load range where HCCI combustion is performed.

FIG. 10 illustrates a selection map related to the operation control of the engine 1. FIG. 10 is an enlarged view of the third range in the first base map 401 of FIG. 4, where the HCCI combustion is performed (i.e., the low-load range 415). The low-load range 415 is defined based on the speed and the load of the engine 1. As illustrated in FIG. 10, the low-load range 415 is further subdivided based on the load and speed of the engine 1. Although in the selection map of FIG. 10 the low-load range 415 is subdivided into nine ranges as one example, the number of subdivided ranges is not limited in particular. Note that although illustration is omitted, such a selection map is set for each range in the base map of FIG. 4.

The "G/F-$T_{IVC}$ range" corresponding to FIG. 9 is set for each subdivided range in the low-load range 415. As described above, the "G/F-$T_{IVC}$ range" defines the combustion mode based on the G/F of the mixture gas and the in-cylinder temperature $T_{IVC}$. The ECU 10 sets (temporarily sets) the combustion mode based on the base map of FIG. 4 according to the demanded load and speed of the engine 1, and adjusts the filling amount of intake air. Furthermore, the ECU 10 conclusively determines the combustion mode based on the selection map of FIG. 10 according to the demanded load and speed, and the estimated G/F and in-cylinder temperature $T_{IVC}$.

Here, as illustrated in FIG. 10, the "G/F-$T_{IVC}$ range" varies according to the load and speed of the engine 1. When the speed is high, the HCCI combustion, the MPCI combustion, and the SPCCI combustion are possible even when the in-cylinder temperature is high. On the other hand, when the speed is low, the HCCI combustion and the MPCI combustion are possible only when the in-cylinder temperature is low.

Moreover, when comparing the ranges at the same load, the "G/F-$T_{IVC}$ range" of the SPCCI combustion increases and the "G/F-$T_{IVC}$ range" of the retarded SI combustion decreases, as the speed increases. On the contrary, the "G/F-$T_{IVC}$ range" of the SPCCI combustion decreases and the "G/F-$T_{IVC}$ range" of the retarded SI combustion increases as the speed decreases.

Moreover, when comparing the ranges at the same speed, in both of the "G/F-$T_{IVC}$ ranges" of the HCCI combustion and the MPCI combustion, the minimum in-cylinder temperature $T_{IVC}$ moves to the higher-temperature side as the load decreases.

As described above, the "G/F-$T_{IVC}$ range" varies according to the load and speed of the engine 1. Particularly, as illustrated in FIG. 11, among the control factors, a G/F at a border of a to-be-selected combustion mode (hereinafter, may be referred to as a "switching G/F") largely varies according to the demanded load of the engine 1, when the speed of the engine 1 is constant and the in-cylinder temperature $T_{IVC}$ is fixed.

Figure 11:
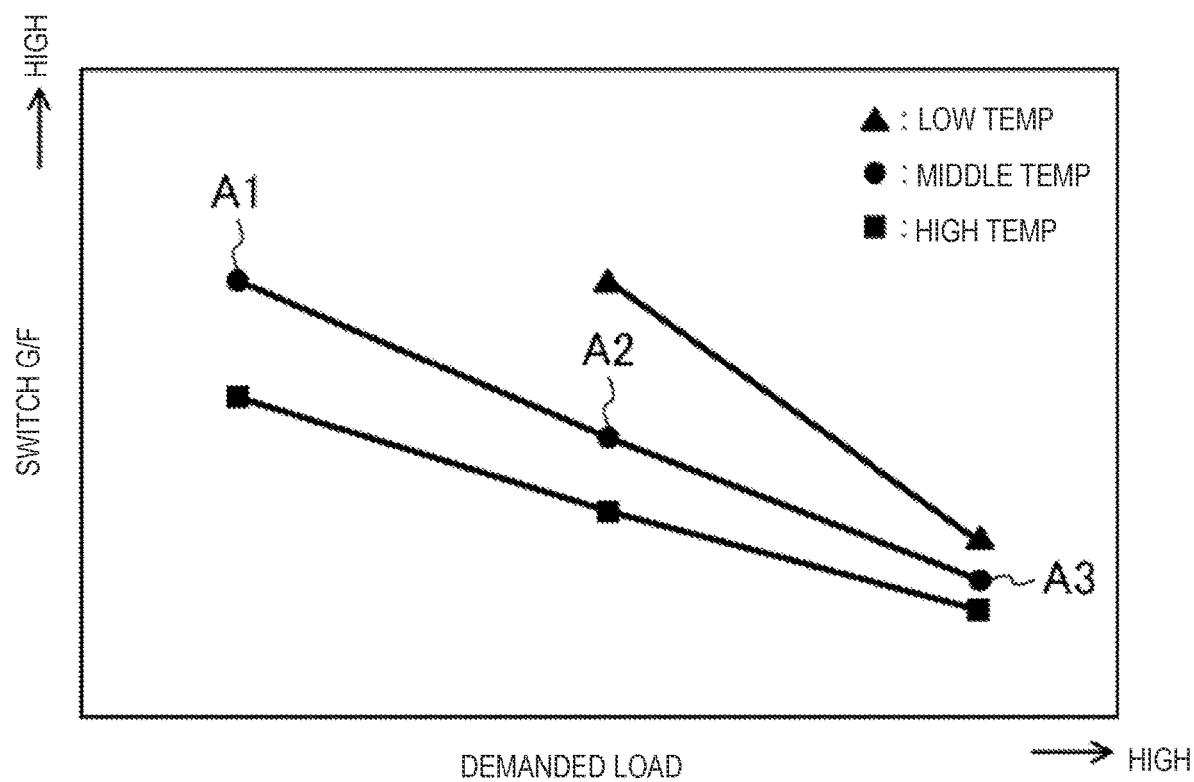
FIG. 11 is a graph illustrating a relationship between a switching G/F and a demanded load, where the switching G/F is for the switching between a combustion mode where the entire mixture gas combusts by compression ignition and a combustion mode where at least part of the mixture gas combusts by flame propagation.

FIG. 11 is a graph illustrating a relationship between the switching G/F and the demanded load, where the switching G/F is the border between the combustion mode where the entire mixture gas combusts by compression ignition (the MPCI combustion or the HCCI combustion) and the combustion mode where at least a part of the mixture gas combusts by flame propagation (the SPCCI combustion, the retarded SI combustion, or the homogeneous SI combustion).

Here, in FIG. 11, the speed is set to a speed at which at least the HCCI combustion is achieved (e.g., 1,000 rpm). Moreover, in FIG. 11, the range of the demanded load is a value at or below the demanded load at which the HCCI combustion is possible as illustrated in FIGS. 4 and 10.

Moreover, the vertical axis in FIG. 11 indicates the switching G/F at the border between the MPCI combustion and the SPCCI combustion, and the switching G/F is defined based on the "G/F-$T_{IVC}$ range" of the MPCI combustion. The ECU 10 executes the MPCI combustion or the HCCI combustion when the G/F is above the switching G/F, and executes the SPCCI combustion, the retarded SI combustion, or the homogeneous SI combustion when the G/F is below the switching G/F.

Moreover, black square markers indicate the switching G/F when the $T_{IVC}$ is relatively high, black circle markers indicate the switching G/F when the $T_{IVC}$ is lower than the black square markers, and black triangle markers indicate the switching G/F when the $T_{IVC}$ is lower than the black circle markers.

For example, markers A1 to A3 in FIG. 11 correspond to markers A1 to A3 illustrated in FIG. 10, respectively. The selection map illustrated in FIG. 10 and the graph illustrated in FIG. 11 are merely illustration for the description. The mode of the selection map seamlessly changes according to the demanded load and speed. The graph illustrated in FIG. 11 also changes continuously corresponding to the change in the mode of the selection map. That is, although the markers illustrated in FIG. 11 correspond to the map in the left column in FIG. 10, it is merely illustration. When the speed is constant, the graph shows a tendency similar to the graph illustrated in FIG. 11.

As illustrated in FIG. 11, in the state where the $T_{IVC}$ is fixed, the switching G/F when the demanded engine load is high is lower than that when the demanded load is low. Particularly, the graph shows that the switching G/F monotonously decreases as the demanded load increases. When the demanded load is relatively high, the fuel injection amount is larger than when the demanded load is low, which relatively increases the density of fuel inside the cylinder 11. According to the relative increase in the fuel density, the combustion stability in the MPCI combustion and the HCCI combustion relatively increase. Therefore, when the demanded load is high, the MPCI combustion and the HCCI combustion can suitably be achieved even using the switching G/F which is lower than when the demanded load is low.

Note that as illustrated in FIG. 11, although the switching G/F is dependent also on the in-cylinder temperature $T_{IVC}$, the relationship between the switching G/F and the demanded load is common in each $T_{IVC}$ at least when the in-cylinder temperature $T_{IVC}$ is fixed.

Therefore, in this embodiment, the ECU 10 estimates the mass ratio (G/F) of the intake air inside the cylinder containing burnt gas to fuel. While the engine speed is at a given speed and the demanded load is a first load, when the estimated G/F is above a first G/F, the ECU 10 controls the injector 6 to execute the HCCI combustion or the MPCI combustion, and when the estimated G/F is below the first G/F, the ECU 10 controls the injector 6, the first spark plug 251, and the second spark plug 252 to execute the SPCCI combustion, the retarded SI combustion, or the homogeneous SI combustion.

Moreover, in this embodiment, while the engine speed is at the given speed and the demanded load is a second load higher than the first load, when the ECU 10 estimates that the G/F is above a second G/F which is lower than the first G/F, the ECU 10 controls the injector 6 to execute the HCCI combustion or the MPCI combustion, and when the ECU 10 estimates that the G/F is below the second G/F, the ECU 10 controls the injector 6, the first spark plug 251, and the second spark plug 252 to execute the SPCCI combustion, the retarded SI combustion, or the homogeneous SI combustion.

Here, the given speed is an engine speed which is arbitrarily set within a range where at least the HCCI combustion or the MPCI combustion is executed.

Therefore, when the engine load is the second load, the ECU 10 according to this embodiment sets the switching G/F (the second G/F) which is the border between the combustion mode where at least part of the mixture gas combusts by flame propagation and the combustion mode where the entire mixture gas combusts by compression ignition, to be lower than the switching G/F (the first G/F) at the first load. As a result, the range of the G/F at which the MPCI combustion or the HCCI combustion is possible can be extended to the lower-G/F side. Such increase in the G/F range allows the flame propagation combustion to be switched to the CI combustion earlier, thus improving fuel efficiency.

Moreover, as illustrated in FIG. 10, in addition to the switching G/F (the first G/F and the second G/F) for the switching between the MPCI combustion or the HCCI combustion, and the SPCCI combustion, the retarded SI combustion, or the homogeneous SI combustion, the switching G/F (a third G/F) for the switching between the MPCI combustion and the HCCI combustion is set. In detail, in the case where the ECU 10 according to this embodiment controls the injector 6 to execute the CI combustion of the entire mixture gas inside the cylinder 11, the ECU 10 executes the HCCI combustion when the ECU 10 estimates that the G/F is above the third G/F which is higher than the first G/F, and executes the MPCI combustion when the ECU 10 estimates that the G/F is above the first G/F and below the third G/F.

As described above, the ECU 10 controls the injector 6 to inject fuel during the intake stroke when executing the HCCI combustion, and controls the injector 6 to inject fuel during each of the intake stroke and the compression stroke when executing the MPCI combustion.

Moreover, as illustrated in FIG. 10, the switching G/F (a fourth G/F) for the switching between the SPCCI combustion, and the retarded SI combustion or the homogeneous SI combustion is also set. In detail, in the case where the ECU 10 according to this embodiment controls the injector 6, the first spark plug 251, and the second spark plug 252 to execute the flame propagation combustion of at least part of the mixture gas inside the cylinder 11, the ECU 10 executes the SPCCI combustion when the ECU 10 estimates that the G/F is above the fourth G/F, and executes the retarded SI combustion or the homogeneous SI combustion when the ECU 10 estimates that the G/F is below the fourth G/F.

As described above, by setting the switching G/F corresponding to the combustion mode, the combustion mode can seamlessly be switched between the combustion mode (the homogeneous SI combustion, the retarded SI combustion, or the SPCCI combustion) where at least part of the mixture gas combusts by flame propagation, and the combustion mode (the MPCI combustion or the HCCI combustion) where the entire mixture gas combusts by compression ignition. As a result, combustion stability can be secured and abnormal combustion can be reduced.

Next, process of operation control of the engine 1, executed by the ECU 10 is described with reference to FIGS. 12 and 13. First, at step S1, the ECU 10 acquires the measurement signals of the various sensors, and next at step S2, the ECU 10 calculates a target torque Tq (or the demanded load) based on the engine speed Ne and an accelerator opening APO.

At step S3, the ECU 10 selects the first base map 401 or the second base map 402 illustrated in FIG. 4 based on the temperature of the coolant of the engine 1, and temporarily determines the combustion mode based on the calculated target torque Tq and the engine speed Ne, and the selected base map.

At step S4, the ECU 10 calculates, based on the operating state of the engine 1, a target valve timing VT and a target valve lift VL for each of the intake valve 21 and the exhaust valve 22. The target valve lift VL includes the valve lift of the intake valve 21 which is continuously changed by the intake CVVL 232, and the cam of the exhaust valve 22 switched by the exhaust VVL 242. Moreover, at step S4, the ECU 10 calculates a target amount of fuel injection Qf.

At step S5, the ECU 10 outputs the control signals to the intake S-VT 231, the intake CVVL 232, the exhaust S-VT 241, and the exhaust VVL 242 to achieve the target valve timing VT and the target valve lift VL.

At step S6, the ECU 10 detects an actual valve timing VT and an actual valve lift VL of the intake valve 21, and an actual valve timing VT and an actual valve lift VL of the exhaust valve 22, based on the measurement signals of the intake cam-angle sensor SW8, the exhaust cam-angle sensor SW9, and the intake cam-lift sensor SW10.

At step S7, the ECU 10 estimates the amount of burnt gas (EGR amount) and fresh air introduced into the cylinder 11 based on the actual valve timing VT and valve lift VL, an air temperature Tair, and a coolant temperature Thw of the engine 1.

Then, at step S8, the ECU 10 estimates the G/F of the mixture gas and the in-cylinder temperature $T_{IVC}$ based on the fuel injection amount Qf, and the amount of burnt gas and fresh air estimated at step S7.

Next, at step S9, the ECU 10 sets the G/F (i.e., the switching G/F) for the switching of the combustion mode, based on the target torque Tq calculated at step S2 and the in-cylinder temperature $T_{IVC}$ estimated at step S8. This switching G/F is set for each of the HCCI combustion, the MPCI combustion, the SPCCI combustion, and the SI combustion similarly to the first G/F, the second G/F, the third G/F, and the fourth G/F described above. Note that the "SI combustion" as used herein includes the retarded SI combustion and the homogeneous SI combustion.

At step S10, the ECU 10 determines the combustion mode corresponding to the G/F estimated at Step s8. In detail, at Step s10, the ECU 10 executes the flow illustrated in FIG. 13.

In detail, at step S101, the ECU 10 determines whether the estimated G/F is above the switching G/F for the switching to the HCCI combustion. When the ECU 10 determines that the G/F is above the switching G/F for the switching to the HCCI combustion (step S101: YES), the ECU 10 proceeds to step S102. On the other hand, when the ECU 10 determines that the G/F is below the switching G/F for the switching to the HCCI combustion (step S101: NO), the ECU 10 proceeds to step S103.

When the ECU 10 proceeds to step S102, the ECU 10 sets the combustion mode to the HCCI combustion.

On the other hand, when the ECU 10 proceeds to step S103, the ECU 10 determines whether the estimated G/F is above the switching G/F for the switching to the MPCI combustion. When the estimated G/F is above the switching G/F for the switching to the MPCI combustion (Step S103: YES), the ECU 10 proceeds to step S104. On the other hand, when the estimated G/F is below the switching G/F for the switching to the MPCI combustion (step S103: NO), the ECU 10 proceeds to step S105.

When the ECU 10 proceeds to step S104, the ECU 10 sets the combustion mode to the MPCI combustion.

On the other hand, when the ECU 10 proceeds to step S105, the ECU 10 determines whether the estimated G/F is above the switching G/F for the switching to the SPCCI combustion. When the estimated G/F is above the switching G/F for the switching to the SPCCI combustion (step S105: YES), the ECU 10 proceeds to step S106. On the other hand, when the estimated G/F is below the switching G/F for the switching to the SPCCI combustion (step S105: NO), the ECU 10 proceeds to step S107.

When the ECU 10 proceeds to step S106, the ECU 10 sets the combustion mode to the SPCCI combustion.

On the other hand, when the ECU 10 proceeds to step S107, the ECU 10 sets the combustion mode to the SI combustion.

Referring again to FIG. 12, after the ECU 10 selects the combustion mode at step S10, the ECU 10 proceeds to step S11 to determine an ignition timing IGT and the injection pattern (i.e., the injection timing) corresponding to the determined combustion mode.

At step S12, the ECU 10 outputs the control signal to the injector 6. The injector 6 injects fuel based on the determined injection pattern. Moreover, when the ignition is to be performed, the ECU 10 also outputs the control signal to the first spark plug 251 and the second spark plug 252. The first spark plug 251 and the second spark plug 252 ignite the mixture gas.

Figure 12:
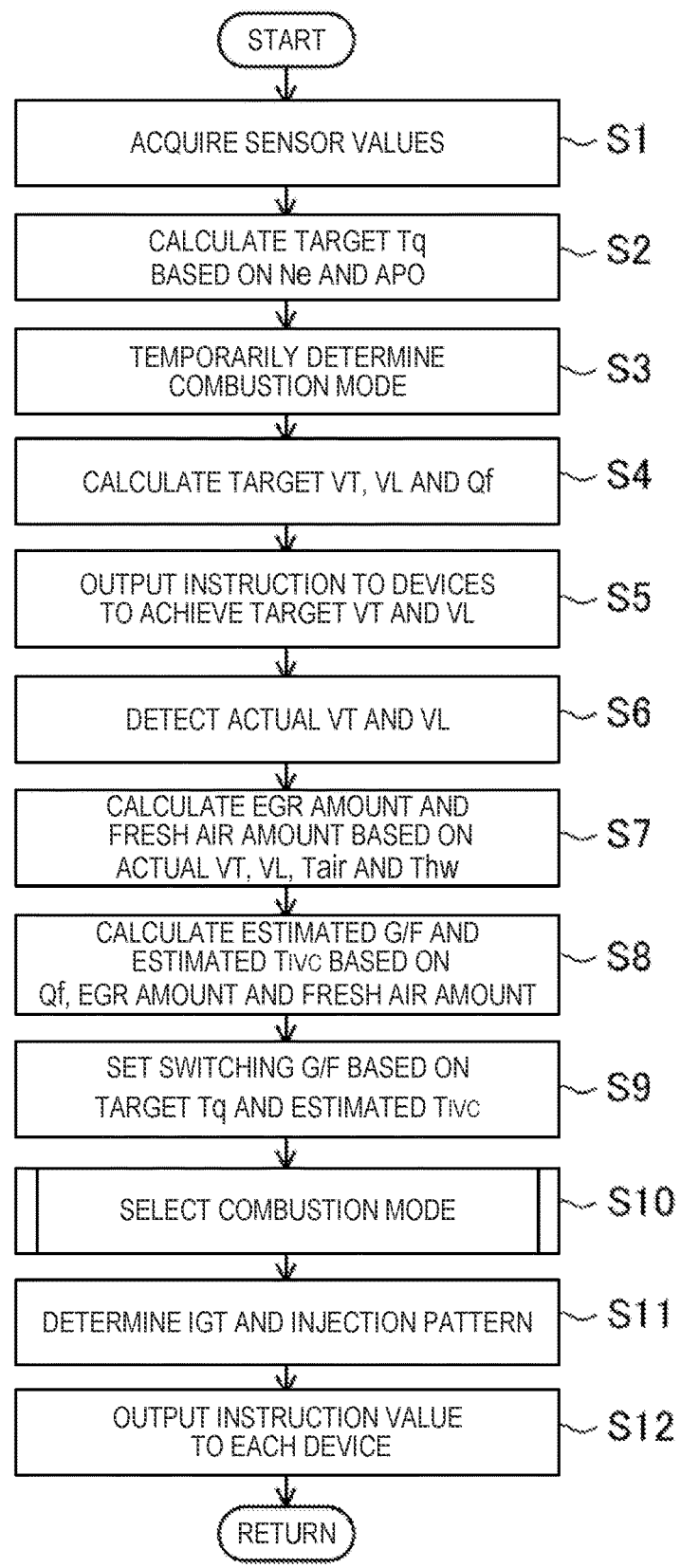
FIG. 12 is a flowchart illustrating control process related to the operation of the engine, executed by an ECU.
Figure 13:
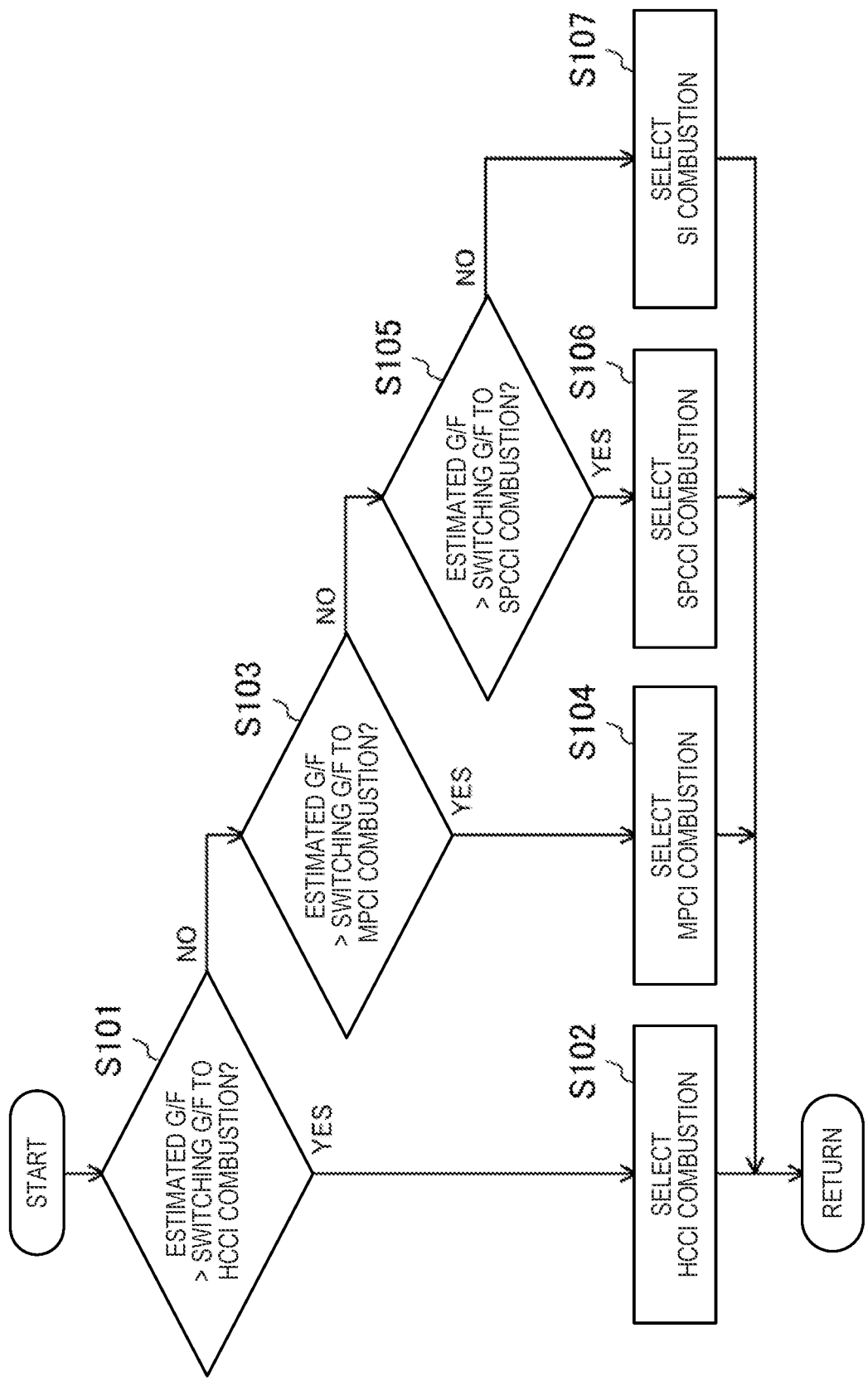
FIG. 13 is a flowchart illustrating control process related to selection of the combustion mode, executed by an engine control unit (ECU).

According to the flowchart in FIG. 12, when the ECU 10 changes the G/F of the mixture gas according to the demanded engine torque, the ECU 10 can set the timing of fuel injection by the injector 6 in consideration of the response delay of the variable valve operating device. Since the mixture gas combusts in the mode suitable for the state inside the cylinder 11, the engine 1 can meet the standard of combustion stability and reduce abnormal combustion.

Note that the present disclosure is applicable not only to the engine with the configuration described above, but to engines with various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
11 Cylinder

21 Intake Valve
22 Exhaust Valve
231 Intake S-VT (Variable Valve Operating Device)
232 Intake CVVL (Variable Valve Operating Device)
241 Exhaust S-VT (Variable Valve Operating Device)
242 Exhaust VVL (Variable Valve Operating Device)
251 First Spark Plug
252 Second Spark Plug
3 Piston
31 Cavity
6 Injector

What is claimed is:

1. An engine system, comprising:
an engine having a cylinder and a piston reciprocatably accommodated in the cylinder;
an injector attached to the engine and configured to inject fuel into the cylinder;
a spark plug attached to the engine and configured to ignite a mixture gas of fuel and intake air, the intake air containing fresh air and burnt gas;
a variable valve operating device connected to an intake valve and an exhaust valve, and configured to control opening and closing of the intake valve and the exhaust valve to adjust a filling amount of the intake air; and
a controller electrically connected to the injector, the spark plug, and the variable valve operating device, and configured to control the injector, the spark plug, and the variable valve operating device according to a demanded load of the engine,
wherein the controller estimates a mass ratio of the intake air inside the cylinder to fuel,
wherein while the engine operates at a given speed and the demanded engine load is a first load, when the mass ratio (G/F) is estimated to be below a first G/F, the controller controls the injector and the spark plug so that at least part of the mixture gas inside the cylinder combusts by flame propagation, and when the mass ratio is estimated to be above the first G/F, the controller controls the injector so that the entire mixture gas inside the cylinder combusts by compression ignition, and
wherein while the engine operates at the given speed and the demanded engine load is a second load higher than the first load, when the mass ratio is estimated to be below a second G/F lower than the first G/F, the controller controls the injector and the spark plug so that at least part of the mixture gas inside the cylinder combusts by flame propagation, and when the mass ratio is estimated to be above the second G/F, the controller controls the injector so that the entire mixture gas inside the cylinder combusts by compression ignition.

2. The engine system of claim 1, wherein while the engine operates at the given speed and the demanded engine load is the first load:
when the mass ratio is estimated to be above a third G/F higher than the first G/F, the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle, and
when the mass ratio is estimated to be above the first G/F and below the third G/F, the controller controls the injector to make the injection center of gravity be at a second timing later than the first timing, and inhibits the operation of the spark plug so that the entire mixture gas inside the cylinder combusts by compression ignition.

3. The engine system of claim 2, wherein while the engine operates at the given speed and the demanded engine load is the first load:
when the mass ratio is estimated to be above the third G/F, the controller controls the injector to inject fuel during an intake stroke, and
when the mass ratio is estimated to be above the first G/F and below the third G/F, the controller controls the injector to inject fuel during each of the intake stroke and a compression stroke.

4. The engine system of claim 3, wherein while the engine operates at the given speed, and the controller controls the injector and the spark plug so that at least part of the mixture gas inside the cylinder combusts by flame propagation:
when the mass ratio is estimated to be above a fourth G/F, the controller actuates the spark plug so that at least part of the mixture gas inside the cylinder combusts by flame propagation, and the remaining mixture gas combusts by compression ignition, and
when the mass ratio is estimated to be below the fourth G/F, the controller actuates the spark plug so that the entire mixture gas inside the cylinder combusts by flame propagation.

5. The engine system of claim 4, wherein the variable valve operating device controls the opening and closing of the intake valve and the exhaust valve so that the burnt gas remains inside the cylinder, or the burnt gas is introduced into the cylinder through the intake valve or the exhaust valve.

6. The engine system of claim 5, wherein a geometric compression ratio of the engine is 15:1 or above.

7. The engine system of claim 4, wherein a geometric compression ratio of the engine is 15:1 or above.

8. The engine system of claim 3, wherein the variable valve operating device controls the opening and closing of the intake valve and the exhaust valve so that the burnt gas remains inside the cylinder, or the burnt gas is introduced into the cylinder through the intake valve or the exhaust valve.

9. The engine system of claim 3, wherein a geometric compression ratio of the engine is 15:1 or above.

10. The engine system of claim 2, wherein while the engine operates at the given speed, and the controller controls the injector and the spark plug so that at least part of the mixture gas inside the cylinder combusts by flame propagation:
when the mass ratio is estimated to be above a fourth G/F, the controller actuates the spark plug so that at least part of the mixture gas inside the cylinder combusts by flame propagation, and the remaining mixture gas combusts by compression ignition, and
when the mass ratio is estimated to be below the fourth G/F, the controller actuates the spark plug so that the entire mixture gas inside the cylinder combusts by flame propagation.

11. The engine system of claim 10, wherein the variable valve operating device controls the opening and closing of the intake valve and the exhaust valve so that the burnt gas remains inside the cylinder, or the burnt gas is introduced into the cylinder through the intake valve or the exhaust valve.

12. The engine system of claim 2, wherein the variable valve operating device controls the opening and closing of the intake valve and the exhaust valve so that the burnt gas remains inside the cylinder, or the burnt gas is introduced into the cylinder through the intake valve or the exhaust valve.

13. The engine system of claim 2, wherein a geometric compression ratio of the engine is 15:1 or above.

14. The engine system of claim 1, wherein the variable valve operating device controls the opening and closing of the intake valve and the exhaust valve so that the burnt gas remains inside the cylinder, or the burnt gas is introduced into the cylinder through the intake valve or the exhaust valve.

15. The engine system of claim 1, wherein a geometric compression ratio of the engine is 15:1 or above.

16. The engine system of claim 1,
wherein a valve lift of the exhaust valve includes a lift curve for the flame propagation combustion and a lift curve for the compression ignition combustion and is switchable therebetween, and
wherein in the lift curve for the compression ignition combustion, after the exhaust valve opens during an exhaust stroke and a lift amount of the exhaust valve gradually decreases after the maximum lift, the exhaust valve maintains a given lift amount until the exhaust valve closes at a given timing during the intake stroke after an intake top dead center.

17. The engine system of claim 16, wherein while the engine operates at the given speed and the demanded engine load is the first load:
when the mass ratio is estimated to be above a third G/F higher than the first G/F, the controller controls the injector to make an injection center of gravity be at a first timing, and inhibits the operation of the spark plug so that the entire mixture gas inside the cylinder combusts by compression ignition, the injection center of gravity being defined based on an injection timing and an injection amount of fuel in one cycle, and
when the mass ratio is estimated to be above the first G/F and below the third G/F, the controller controls the injector to make the injection center of gravity be at a second timing later than the first timing, and inhibits the operation of the spark plug so that the entire mixture gas inside the cylinder combusts by compression ignition.

18. The engine system of claim 17, wherein while the engine operates at the given speed and the demanded engine load is the first load:
when the mass ratio is estimated to be above the third G/F, the controller controls the injector to inject fuel during an intake stroke, and
when the mass ratio is estimated to be above the first G/F and below the third G/F, the controller controls the injector to inject fuel during each of the intake stroke and a compression stroke.

19. The engine system of claim 18, wherein while the engine operates at the given speed, and the controller controls the injector and the spark plug so that at least part of the mixture gas inside the cylinder combusts by flame propagation:
when the mass ratio is estimated to be above a fourth G/F, the controller actuates the spark plug so that at least part of the mixture gas inside the cylinder combusts by flame propagation, and the remaining mixture gas combusts by compression ignition, and
when the mass ratio is estimated to be below the fourth G/F, the controller actuates the spark plug so that the entire mixture gas inside the cylinder combusts by flame propagation.

20. The engine system of claim 19, wherein the variable valve operating device controls the opening and closing of the intake valve and the exhaust valve so that the burnt gas remains inside the cylinder, or the burnt gas is introduced into the cylinder through the intake valve or the exhaust valve.

* * * * *